US005642492A

United States Patent [19]
Iizuka

[11] Patent Number: 5,642,492
[45] Date of Patent: Jun. 24, 1997

[54] DIGITAL RECORDER EMPLOYING PUNCH-IN AND PUNCH-OUT PROCESSES

[75] Inventor: Nobuo Iizuka, Hamura, Japan

[73] Assignee: Casio Computer Co., Ltd., Tokyo, Japan

[21] Appl. No.: 889,466

[22] Filed: May 27, 1992

[30] Foreign Application Priority Data

Jun. 4, 1991 [JP] Japan .................................. 3-159647
Jun. 4, 1991 [JP] Japan .................................. 3-159648

[51] Int. Cl.$^6$ .................................................. G06F 12/00
[52] U.S. Cl. .................. 395/427; 395/2.1; 395/2.79; 369/30; 369/47; 369/60; 360/39; 360/51
[58] Field of Search ................. 395/425, 2, 2.1, 395/427, 2.79, 7.81, 2.09; 369/48, 47, 49, 30, 59, 60; 360/32, 19.1, 39.49, 51; 358/341–343

[56] References Cited

U.S. PATENT DOCUMENTS 5,129,036  7/1992  Dean et al. .................. 395/2
5,303,218  4/1994  Miyake ...................... 369/48

OTHER PUBLICATIONS

JAS Journal, Apr. 1989, pp.16–22; Japan.

*Primary Examiner*—Kee M. Tung
*Attorney, Agent, or Firm*—Frishauf, Holtz, Goodman, Langer & Chick

[57] ABSTRACT

When punch-in is instructed, punch-in data is stored in a predetermined area of a hard disk. Data which is reproduced from a play back track is read in advance at a time earlier by a given time than a punch-out time and is stored in a buffer. When the punch-out time is reached, the data which was read in advance is read out for play back. In this manner, an audio signal is continuously generated even at the punch-out time.

8 Claims, 22 Drawing Sheets

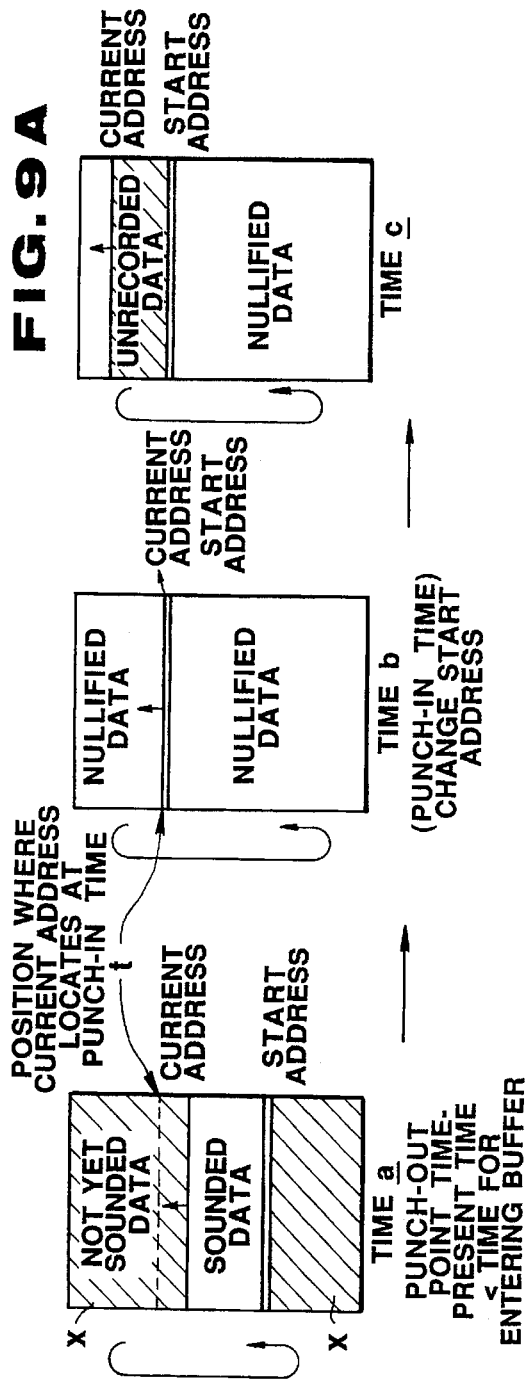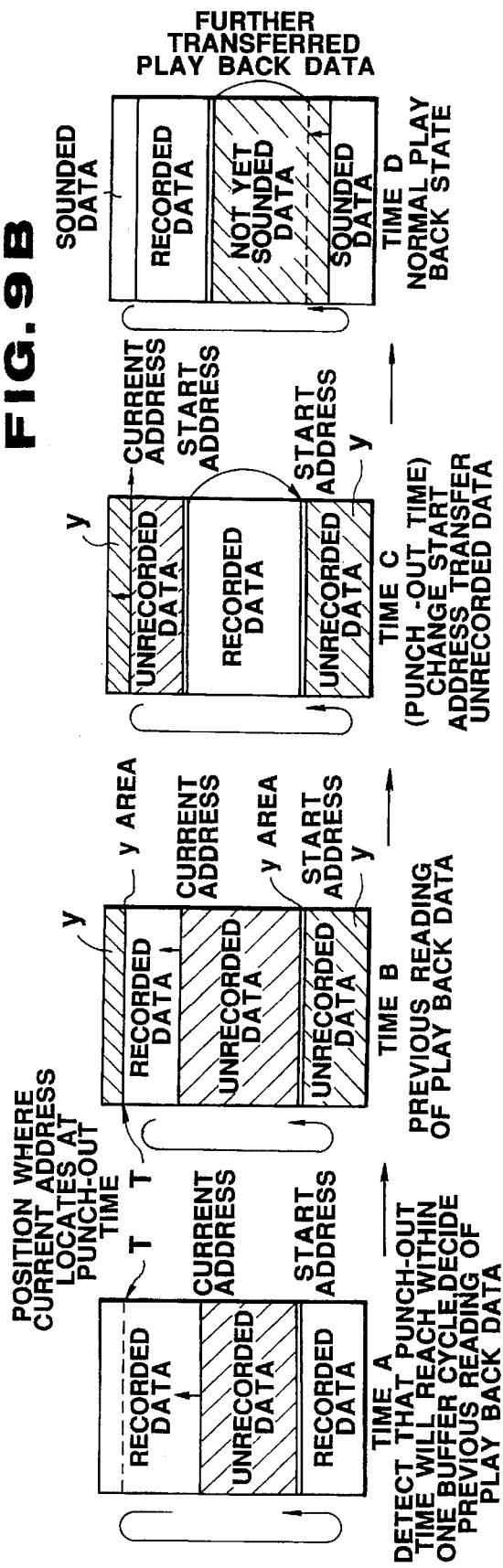

FIG.24

| START | END |
|---|---|
| 0 | 49899 |
| 30000 | 30199 |
| 120100 | 139899 |
| 30200 | 30399 |
| 50100 | 99999 |

DIGITAL RECORDER EMPLOYING PUNCH-IN AND PUNCH-OUT PROCESSES

BACKGROUND OF THE INVENTION

1. Field of the Invention

The present invention relates to a digital recorder which is capable of recording, reproducing and editing an audio signal in a digital fashion.

2. Description of the Related Art

As a method of recording, reproducing and editing an audio signal, a technique has been conventionally employed which records the audio signal on a magnetic tape, and reproduces the audio signal from the magnetic tape and edits it. Since such a prior art involves an analog recording and reproducing process, deterioration in sound quality of the reproduced signal is inevitable. Prominent deterioration in the sound quality will appear particularly when the once-recorded audio signal is dubbed.

Further, use of the magnetic tape as a recording medium raises problems such that it takes time to reach a target editing point on the magnetic tape, and edition requires that the target recorded portion be physically cut and pasted or copied to somewhere else before actually executing the editing operation.

The problem about the deterioration in sound quality can be overcome by employing a method of digital recording a signal on a magnetic tape. There still remains, however, a shortcoming concerning the freedom of locating the starting point or edition due to use of a sequential-access type recording medium.

There have been proposed solutions to the conventional problems, solutions which use a hard disk and a magneto-optical disk as a memory medium. For instance, refer to U.S. Ser. No. 07/690,710 filed on Apr. 24, 1991 Inventor: Nobuo IIZUKA (abandoned in favor of CIP application Ser. No. 07/871,241 filed on Apr. 20, 1992); U.S. Ser. No. 07/752,876 filed on Aug. 30, 1991 Inventor: Atushi MIYAKE; U.S. Ser. No. 07/795,983 filed on Nov. 22, 1991 Inventor: Nobuo IIZUKA (abandoned in favor of continuation application Ser. No. 08/132,445 filed on Oct. 6, 1993); and U.S. Ser. No. 07/807,053 filed on Dec. 12, 1991 (abandoned in favor of continuation application Ser. No. 08/164,305 filed on Dec. 8, 1993).

In recording and reproducing a sound on or from an external memory medium such as a hard disk and a magneto-optical disk, a so called punch-in and punch-out process is to be executed to replace with another audio signal a specific content of an audio signal which was recorded in a specific area on a certain track.

Since the punch-in and punch-out process needs time for accessing the external memory medium, consideration has to be paid to delay in timing of punch-in and punch-out. The punch-in and punch-out process must be also executed with care not to generate a vain time of missing sound.

SUMMARY OF THE INVENTION

The present invention has been made to solve the above mentioned problems, and has an object to provide a digital recorder which allows a punch-in and punch-out process to be executed at any desired timing.

Another object of the present invention is to provide a digital recorder in which a reproduced sound is prevented from being missing due to execution of a punch-in and punch-out process.

According to one aspect of the present invention, there is provided a digital recorder which comprises:

audio input/output means for executing input operation and output operation of an audio signal;

memory medium means for storing an audio signal;

temporarily storing means for temporarily storing an audio signal input from said input/output means and supplying the audio signal to said memory medium means, and for temporarily storing an audio signal input from said memory medium means and supplying the audio signal to said audio input/output means;

punch-in control means for switching said audio input/output means from output operation mode to input operation mode and allowing an audio signal read out from said temporarily storing means to be stored in said memory medium means, when punch-in operation is executed; and punch-out control means for allowing an audio signal to be read out in advance from said memory medium means and to be stored in said temporarily storing means at a predetermined time close to a time when punch-out operation is executed, and for allowing an output of said temporarily storing means to be supplied to said audio input/output means and switching said audio input/output means from input operation to output operation, when punch-out operation is executed.

With the above structure, since the audio signal is read out in advance from the memory medium means and is stored in the temporarily storing means, at a time close to a time when punch-out operation will be executed, the audio signal may be prevented from being missing while punch-out edition is executed.

In the digital recorder mentioned above, it is preferable to arrange such that the punch-in control means and the punch-out control means execute switching operation to switch the operation of audio input/output means within a period shorter than a sampling interval.

As the memory medium means may be used a disk memory medium of a random access type such as a hard disk, an optical disk and a magneto-optical disk.

According to another aspect of the present invention, there is provided a digital recorder which comprises:

audio input/output means for executing input operation and output operation of an audio signal;

memory medium means for storing an audio signal;

temporarily storing means for temporarily storing an audio signal input from said input/output means and supplying the audio signal to said memory medium means, and for temporarily storing an audio signal input from said memory medium means and supplying the audio signal to said audio input/output means;

punch-in control means for switching said audio input/output means from output operation mode to input operation mode and allowing an audio signal read out from said temporarily storing means to be stored in said memory medium means, when punch-in operation is executed; and punch-out control means for allowing an audio signal of a predetermined time late to be read out in advance from said memory medium means and to be stored in said temporarily storing means, and allowing an output of said temporarily storing means to be supplied to said audio input/output means at a time when a time is reached for reading out the audio signal which was read out in advance and switching said audio input/output means from input operation mode to output operation mode, when punch-out operation is executed.

With the above structure, in such case that a punch-out trigger is input at a real time, the audio signal may be output continuously.

Further, it is preferable in the above structure that the punch-in control means and the punch-out control means complete switching operation to switch the operation of audio input/output means within a period shorter than a sampling interval of the audio signal.

As the memory medium means may be also used a disk memory medium of a random access type such as a hard disk, an optical disk and a magneto-optical disk.

According to yet another aspect of the present invention, there is provided a digital recorder which comprises:

memory medium means for storing an audio signal;

first storing means in which an audio signal input for punch-in is written;

second storing means in which an audio signal reproduced from said memory medium means is written, said second storing means adapted to operate in parallel with said first storing means;

instruction means for issuing a command for punch-in and a command for punch-out; and control means for allowing the audio signal written in said first memory means to be read out therefrom and be stored in said memory medium means when said instruction means issues the command for punch-in, while withholding the audio signal written in said second memory means to be read out but allowing the audio signal to be written in said second memory means, and for withholding the audio signal written in said first storing means to be stored in said memory medium means when said instruction means issues the command for punch-out, while allowing the audio signal written in said second storing means to be read out therefrom again.

With the above structure, delay in operation is prevented when the command for punch-in is issued and no soundless portion can be created when the command for punch-out is issued.

The instruction means may be designed such that it detects a level of an audio signal for punch-in and issues the command for punch-in when the detected level of the audio signal exceeds a certain reference level. With this instruction means, punch-in operation may be automatically executed.

The control means allows a portion of the audio signal written in the first storing means to be stored in the memory medium means, the portion which is generated in a time duration starting at a time offset earlier by a predetermined time than the time when the command for punch-in is issued. Delay in punch-in operation therefore is compensated and the punch-in operation may be executed at a correct position.

The control means can obtain an address of the second storing means assigned at the time of punch-in, or an address assigned immediately after the time of punch-out from addresses in the first storing means, and hence punch-in data may be controlled accurately.

In the above structure, a disk memory medium of a random access type such as a hard disk, an optical disk and a magneto-optical disk may be used as the memory medium means.

It would be apparent to those skilled in the art from the following description of preferred embodiments that the present invention may be modified in various manners as well as applied to different cases.

BRIEF DESCRIPTION OF THE DRAWINGS

Other objects and structures of the present invention will be more fully understood by those killed in the art from the following description of the preferred embodiments and the accompanying drawings.

FIGS. 9A and 9B are views illustrating operation of a buffer in the embodiment of FIG. 1;

FIG. 24 is a view illustrating a play-back schedule table.

DETAILED DESCRIPTION OF THE PREFERRED EMBODIMENTS

Now, several preferred embodiments of a digital recorder according to the present invention will be described referring to the accompanying drawings.

<General Structure>

Figure 1:
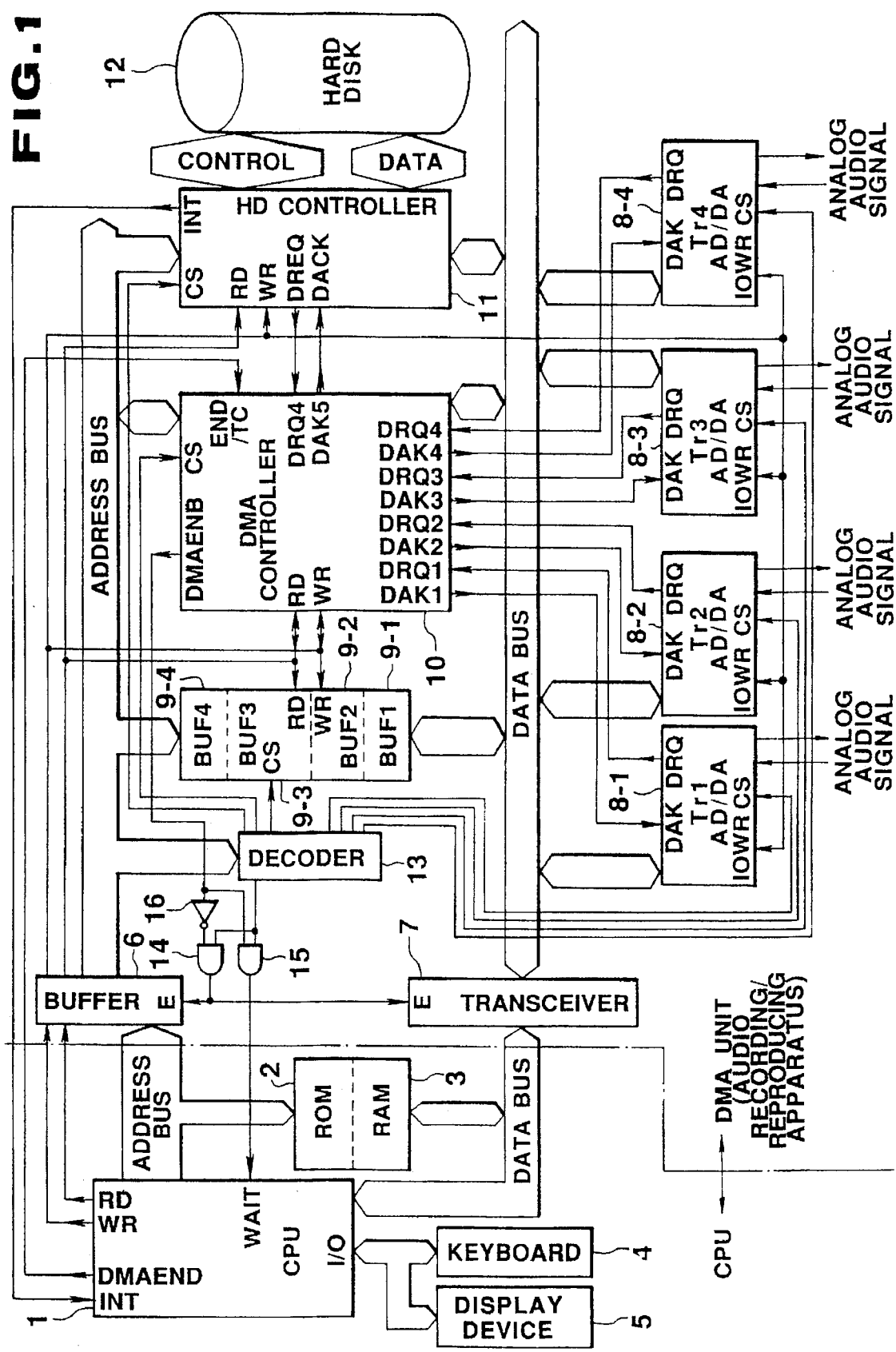
FIG. 1 is a block diagram showing a structure of an embodiment of a digital recorder according to the present invention.

FIG. 1 is a view showing the general structure of the first embodiment of the digital recorder of the present invention.

The first embodiment allows record and play back operation to be performed with respect to up to four tracks simultaneously. The structure is divided into a CPU section (a left side portion of the drawing) and a DMA unit (a sound recording and play back apparatus) (a right side portion of the drawing).

The CPU section comprises CPU 1, a program ROM 2 which stores a program (to be described in detail later) for specifying operation of CPU 1, RAM 3 including an area for storing various data, an area storing current pointers for four tracks and a work area, and peripheral devices connected to an input/output port of CPU 1, such as a key board 4 which comprises various function keys and data input keys and a display device 5 which includes a cathode ray tube (CRT) or a liquid crystal display (LCD) to provide various displays. As will be described later, in a real time operation mode (in a record/play back mode) CPU 1 controls operation of individual components of DMA unit as needed while an address bus and a data bus in DMA unit are not busy. In an edition mode, CPU 1 disposes data blocks and operates a disk access pointer. Setting the record/play back mode for individual tracks, starting and stopping the mode, locating the track, and designation of editing point can be effected using the keyboard 4, as will be described later.

An address signal is sent from CPU 1 through an address bus to the address terminals of the program ROM 2 and RAM 3 which have their output terminals connected through a data bus to CPU 1 or a transceiver 7.

A buffer 6 and the transceiver 7 are provided in the DMA unit to connect the CPU section to the DMA unit. The buffer 6 is connected via an address bus to CPU 1, and is connected to an address bus in the DMA unit. The transceiver 7 is connected via the data bus to CPU 1, and is also connected to a data bus in the DMA unit.

In the DMA unit are provided an audio input/output device (hereafter referred to as audio I/O device) 8-1 for a track Tr1, an audio I/O device 8-2 for a track Tr2, an audio I/O device 8-3 for a track Tr3 and an audio I/O device 8-4 for a track Tr4, which will independently receive or output an analog audio signal.

The audio I/O devices 8-1 to 8-4 each include a converter for selectively executing A/D or D/A conversion on an audio signal, a low pass filter for eliminating sampling noises appeared in the audio signal and a clock circuit for generating a clock signal of a sampling cycle. In the audio I/O devices 8-1 to 8-4, externally supplied analog audio signals are properly filtered every sampling cycle, and then are subjected to A/D conversion, yielding digital audio data, when the tracks for the respective audio I/O devices are set to the record mode, while digital audio data previously read out are subjected to D/A conversion every sampling cycle and then are properly filtered to output analog audio signals, when the tracks are set to the play back mode.

The audio I/O devices 8-1 to 8-4 for the tracks Tr1 to Tr4 are connected via the data bus to buffers 9-1 (BUF1), 9-2 (BUF2), 9-3 (BUF3) and 9-4 (BUF4), respectively, for exchanging digital audio data with each other.

The buffers 9-1 to 9-4 correspond to the tracks Tr1 to Tr4, respectively, and data transfer between the buffers 9-1 to 9-4 and the audio I/O devices 8-1 to 8-4 is executed through a direct memory accessing method under control of a DMA controller 10.

Request signals DRQ1 to DRQ4 and acknowledge signals DAK1 to DAK4 are exchanged between the audio I/O devices 8-1 to 8-4 and the DMA controller 10.

In the record mode, the audio I/O devices 8-1 to 8-4 request the DMA controller 10 every sampling cycle for DMA transfer (single transfer) of digital data relating to one sampling from the audio I/O devices 8-1 to 8-4 towards the buffers 9-1 to 9-4 respectively. That is, the audio I/O devices send DRQ signals to the DMA controller 10 (DRQ1 for Tr1, DRQ2 for Tr2, DRQ3 for Tr3 and DRQ4 for Tr4). The data transfer will be actually executed in response to acknowledge signals sent back from the DMA controller 10 to the audio I/O devices 8-1 to 8-4 (an acknowledge signal DAK 1 for Tr1, DAK2 for Tr2, DAK3 for Tr3 and DAK 4 for Tr4). In the play mode, the audio I/O devices 8-1 to 8-4 request the DMA controller 10 every sampling cycle for DMA transfer (single transfer) of digital data relating to one sampling from the buffers 9-1 through 9-4 towards the audio I/O devices 8-1 to 8-4. The data transfer is allowed by the DMA controller 10 in a similar manner as described above.

The buffers 9-1 to 9-4 will have a memory capacity enough for storing digital audio data for several samplings. RAM is divided into four portions for Tr1 to Tr4, each of which is designed to function as a FIFO buffer when used as a ring buffer (a buffer whose first address is imaginarily linked to its last address).

The buffers 9-1 to 9-4 are addressed through the address bus by the DMA controller 10. In other words, while the DMA transfer is being executed, the address bus, the data bus and a control signal line within the DMA unit are occupied by the DMA controller 10.

The buffers 9-1 to 9-4 exchange data with a hard disk 12 through the data bus under control of a hard disk controller (hereafter referred to as HD controller) 11. The hard disk 12 and the HD controller 11 are connected to each other through the control signal line. The hard disk 12 is accessed for read/write operation by the HD controller 11. The hard disk 12 has a memory area which is divided into four areas for the respective tracks Tr1, Tr2, Tr3 and Tr4, and data transfer between the hard disk 12 and the buffers 9-1 to 9-4 is executed under control of the DMA controller 10. The DMA controller 10 serves to execute data transfer between the hard disk and the buffers by sending CPU 1 an interrupt (INT) and instructing CPU 1 to transfer another data block after the HD controller 11 has transferred a data block. Upon receipt of the interrupt signal INT from the HD controller 11, CPU 1 sets the DMA controller 10 and the HD controller 11 to desired modes and programs them, and then allows DMA transfer to be executed. This operation will be described in detail later.

In the play back mode, the DMA controller 10 reads out a pre-designated amount of digital audio data (data for several sampling cycles) from the hard disk 12, and then executes DMA transfer (block transfer) of the read out data to a specified buffer among the buffers 9-1 to 9-4. In the record mode, the DMA controller 10 reads out a pre-designated amount of digital audio data (data for several sampling periods) from the specified buffer, and then executes DMA transfer (block transfer) of the read out data to a designated position on the hard disk 12.

For data transfer between the hard disk 12 and the buffers 9-1 to 9-4, the HD controller 11 sends a request signal DREQ to the DMA controller 10 (the DMA controller 10 receives the request signal DREQ as DRQ5). When the data transfer is made ready, the HD controller 11 receives an acknowledge signal DACK (the DMA controller 10 sends the signal as DAK5), entering an actual data transfer mode.

As described above, the DMA controller 10 performs data transfer for five channels in a time sharing manner: data transfer for four channels (CH1 to CH4 to be described later) between the audio I/O devices 8-1 to 8-4 for Tr1 to Tr4 and the buffers 9-1 to 9-4; and data transfer for one channel (CH5 to be described later) between the hard disk 12 and a buffer sequentially selected among from the buffers 9-1 to 9-4.

CPU 1 supplies an address signal via the address bus to the buffer 6 to control the functions and operations of the component in the DMA unit. CPU 1 also sends a designating signal for designating the component to a decoder 13 through the buffer 6, supplying designating signals CS to the audio I/O devices 8-1 to 8-4, the buffers 9-1 to 9-4, the DMA controller 10 and the HD controller 11, respectively. At the same time, CPU 1 exchanges various data with these components through via the data bus through the transceiver 7.

Further, CPU 1 supplies the audio I/O devices 8-1 to 8-4 at their respective IOWR terminals through the buffer 6 with a designating signal WR for designating which mode, the record mode (write mode) or the play mode (read mode) should be set to these devices.

CPU 1 sends the designating signal (write signal) WR and another designating signal (read signal) RD to the buffers 9-1 to 9-4, the DMA controller 10 and the HD controller 11, for reading out data from and writing data in these components. The DMA controller 10 also outputs the designating signals RD and WR in the DMA transfer mode. Relationship among these signals, the functions and the operations of the individual components will be described later.

The DMA controller 10 sets a DMA enabling signal DMAENB to "1" and outputs it, while DMA transfer is executed between the components. When the signal DMAENB is sent to an AND gate 14 through an invertor 16, the output of the gate 14 is made "0". As a result, the enabling signal E is sent as "0" to the buffer 6 and the transceiver 7 to disable the CPU section and the DMA unit to exchange data and addresses with each other. When a signal of "1" is sent to an AND gate 15 from the decoder 13 in this case, the output of the gate 15 becomes "1", allowing a wait signal WAIT to be supplied to CPU 1.

While CPU 1 supplies the decoder 13 with a predetermined signal to enable the buffer 6 and the transceiver 7 in order to control the DMA unit, i.e., while CPU 1 is sending a signal of "1" from the decoder 13 to one of the input terminals of the AND gate 14 (when CPU 1 outputs an address signal to access any of the buffers 9-1 to 9-4, the DMA controller 10, the HD controller 11 and audio I/O devices 8-1 to 8-4, the output of the decoder 13 will be active, sending a signal of "1" to one of the input terminals of the respective AND gates 14 and 15), CPU 1 receives the signal WAIT to execute DMA transfer by priority over other operations. When DMA transfer is completed, the WAIT is released to restart the operation of CPU 1.

Even if CPU 1 tries to access, for example, the DMA controller 10 while the controller 10 is executing DMA transfer, the wait signal WAIT is supplied to CPU 1 from the AND gate 15, and the execution cycle of CPU 1 is made longer, disabling the buffer 6 and the transceiver 7 during this period.

In short, CPU 1 can access the components in the DMA unit when the following two conditions are satisfied:

(1) when CPU 1 outputs an address to access the components in the DMA unit, and (2) when the signal DMAENB is inactive ("0") or when the data bus in the DMA unit is not busy.

CPU 1, however, can proceed with process without considering when to access the DMA unit in accordance with the action of gates 14 and 15.

To immediately change the operation mode of the DMA unit in response to a key input or a triggering by control data, CPU 1 can send a command DMAEND to the DMA controller 10 for stopping DMA transfer whatever mode the controller 10 is in (the command is sent as an END signal to the DMA controller 10).

<Structure of Essential Portion of DMA Controller 10>

Now, one example of the structure of the DMA controller 10 will be described. The DMA controller 10 has an ability to transfer data in a bus cycle of several hundreds nanoseconds. It therefore will take one to two microseconds to transfer sampling data of four tracks.

With a sampling frequency fs of 48 KHz, an interval of sampling operations will be about 21 microseconds. Most of the time between the sampling operations may be assigned to the time for data transfer among the buffers 9-1 to 9-4, the HD controller 11 and the hard disk 12 and the time for CPU 1 to program the individual components.

Figure 2:
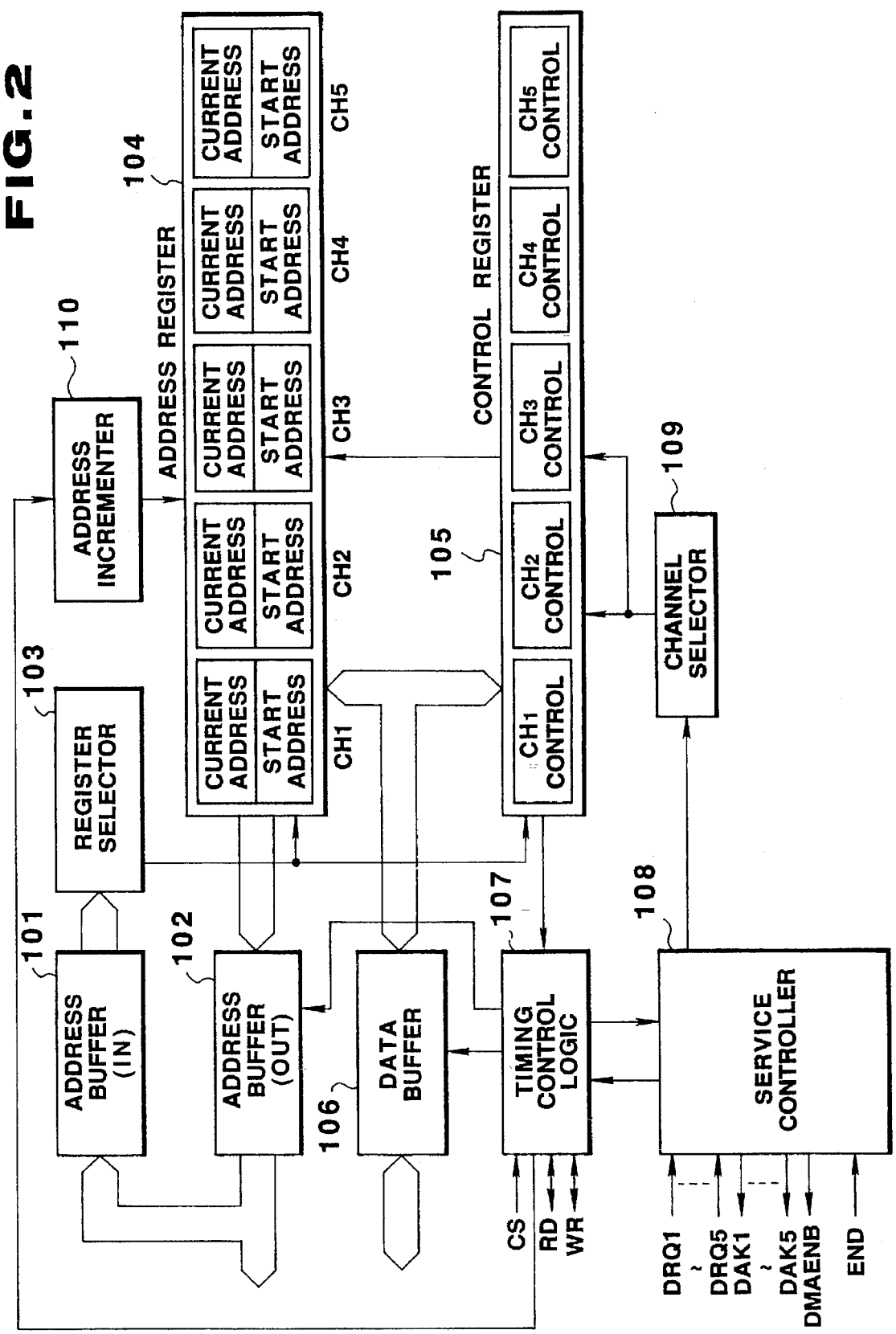
FIG. 2 is a block diagram showing a structure of an embodiment of DMA controller in FIG. 1.

The structure of the essential portion of the DMA controller is shown in FIG. 2. The DMA controller 10 has an address buffer 101 on the input side (IN) to be connected to the address bus and an address buffer 102 on the output side (OUT). An address signal to be supplied to the address buffer 101 on the input side changes content designated by a register selector 103, designating desired registers in an address register 104 and a control register 105.

The address register 104 and the control registers 105 include five areas corresponding to channels CH1 to CH5, respectively. The channels CH1 to CH4 are registers for DMA transfer between the buffers 9-1 to 9-4 and the audio I/O devices 8-1 to 8-4, and the channel CH5 is a register for DMA transfer between a designated buffer among the buffers 9-1 to 9-4 and the hard disk 12.

The registers of the channels CH1 to CH5 in the address register 104 each have areas for storing at least current addresses and start addresses of relevant buffer 9-1 to 9-4 and the designated buffer. The areas of the channels CH1 to CH5 in the control register 105 store, for instance, control data for designating a direction in which DMA transfer is executed.

The contents of the address register 104 and the control register 105 are ready for being input to or output from the data bus through the data buffer 106. A timing control logic 107, a service controller 108 and a channel selector 109 serve to control these components.

The service controller 108 is of a hard logic type or of a microprogram controlled type. The service controller 108 receives a signal from the timing control logic 107, the DMA request signals DRQ1 to DRQ5 from the audio I/O devices 8-1 to 8-4 and the HD controller 11, and the DMA end command END (DMAEND) from CPU 1, and the controller 108 outputs acknowledge signals DAK1 to DAK5 to the above components, and the DMA enabling signal DMAENB indicating that DMA transfer is going on. Further, the service controller 108 outputs various commands to the timing control logic 107 and outputs a channel selecting signal to the channel selector 109. The channel selector 109 selectively designates registers corresponding to the respective channels CH1 to CH5 in the address register 104 and the control register 105.

Receiving the designating signal CS from the decoder 13, the control signal from the control register 105 and the control signal from the service controller 108, the timing control logic 107 controls data input to and data output from the address buffer 102 and data buffer 106, and further enables an address incremented 110 to increment the current address of the designated channel in the address register 104.

<General Operation of CPU 1>

Figure 3:
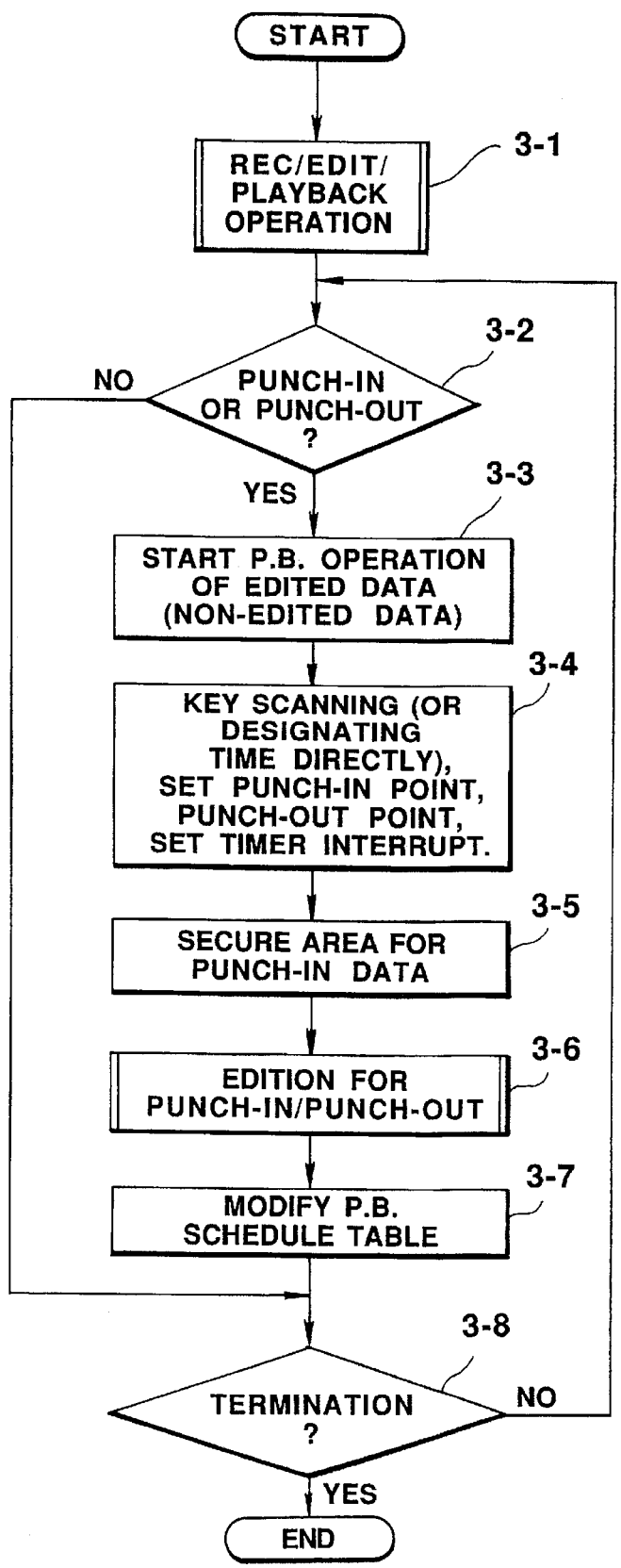
FIG. 3 is a flowchart of a main routine process for illustrating operation of the embodiment shown in FIG. 1.
Figure 4:
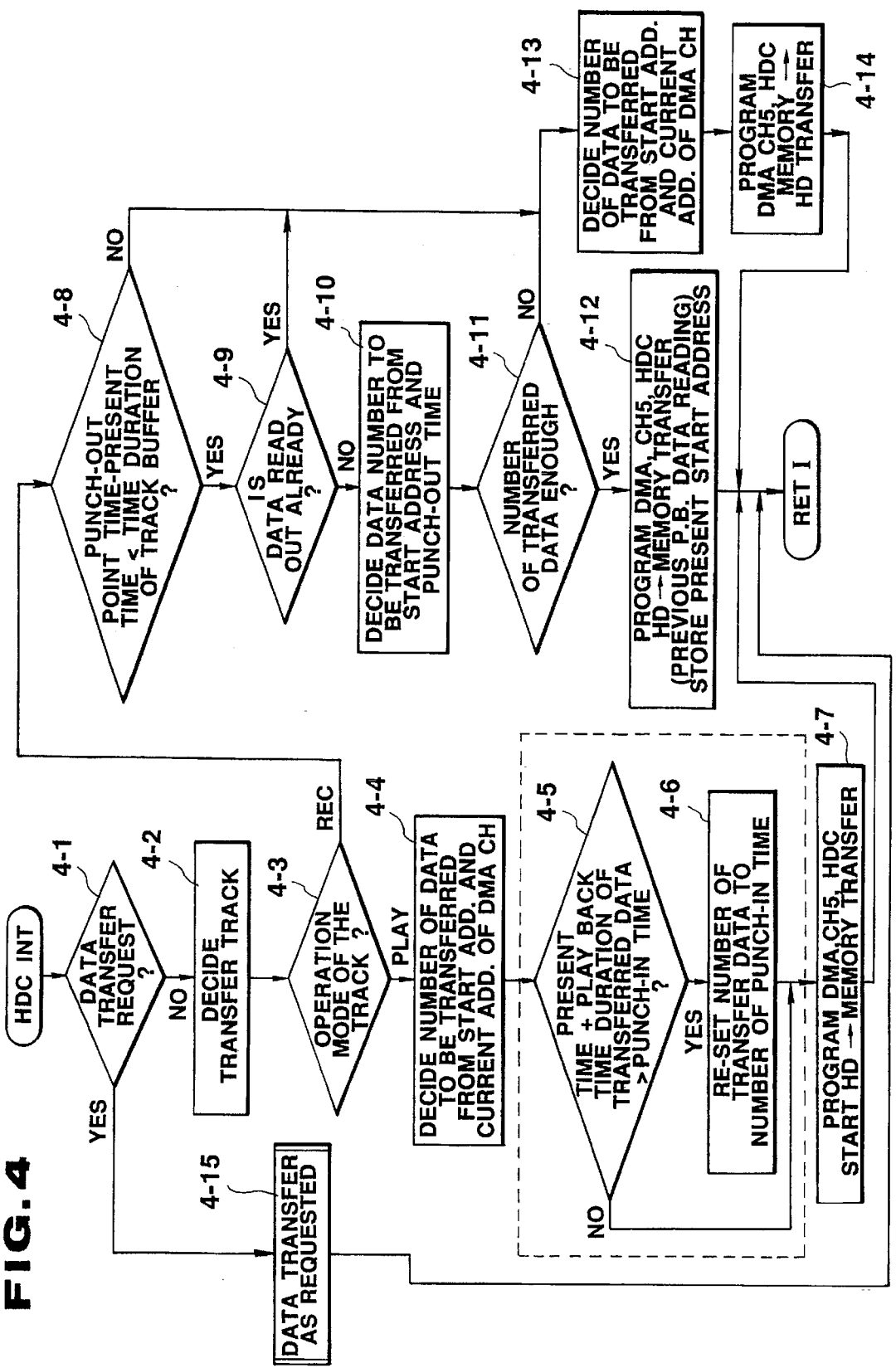
FIG. 4 is a flowchart of an interrupt routine process of a hard disk transfer termination for illustrating operation in a first embodiment.
Figure 5:
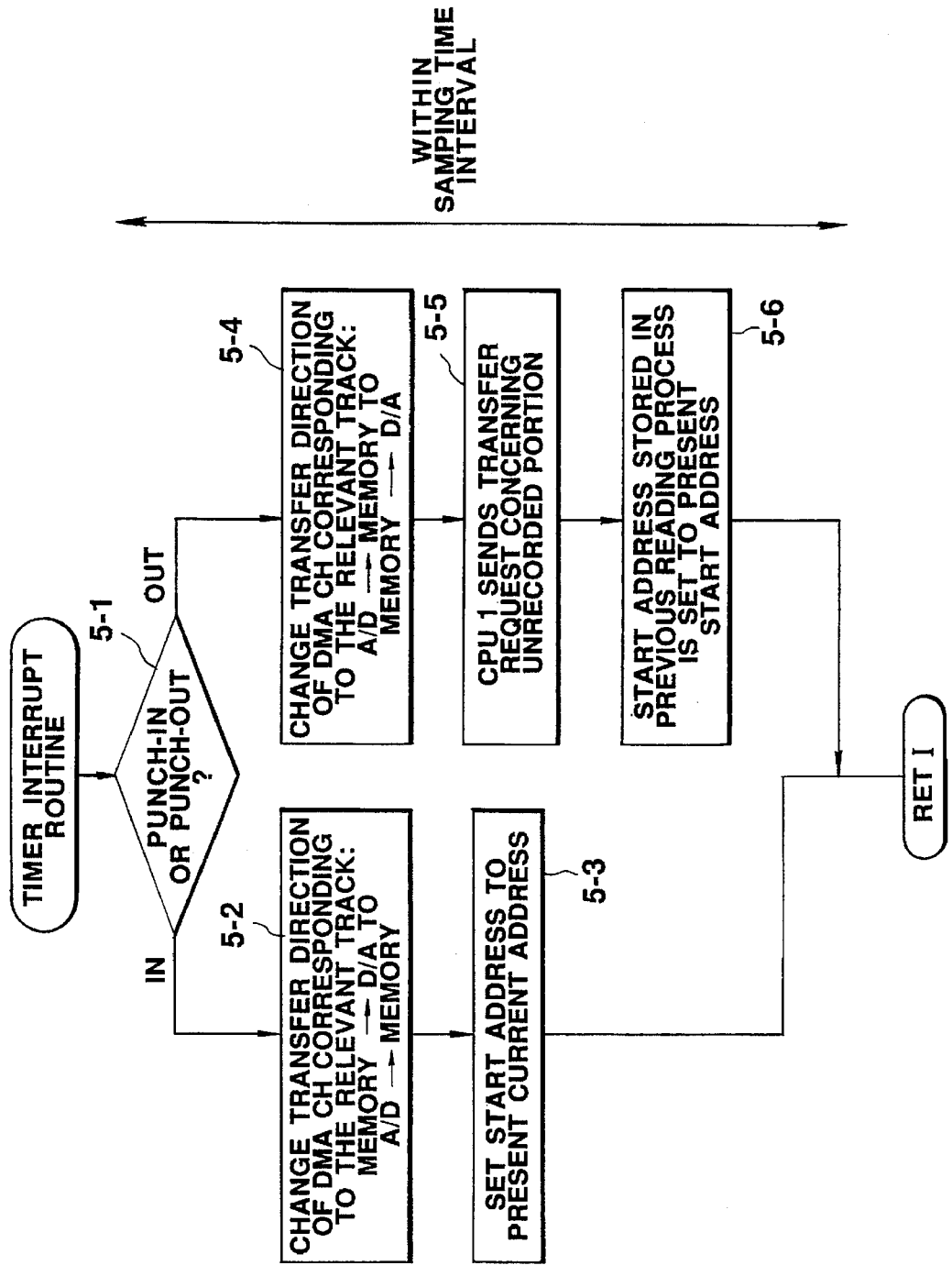
FIG. 5 is a flow chart of a timer interrupt routine process for illustrating the operation of the first embodiment.

General operation of the present embodiment will now be described hereafter. Flowcharts illustrating the operation of CPU 1 are shown in FIGS. 3 to 5. These flowcharts illustrate the operation of CPU 1 executed in accordance with a program (software) stored in the program ROM 2. FIG. 3 is a flowchart showing the main routine process, FIG. 4 is a flowchart of an interrupt routine process which is executed in response to the interrupt signal INT sent from the HD controller 11, and FIG. 5 is a flowchart illustrating the timer interrupt process executed at a timer interrupt in the punch-in and punch-out mode.

In the main routine process of FIG. 3, the normal recording, reproducing and editing operation are performed at step 3-1. In the process at step 3-1, a cut and paste edition is finished, and CPU 1 judges at step 3-2 which operation, punch-in or punch-out, should be executed. When both operations, punch-in and punch-out are not necessary to be executed, CPU 1 goes to step 3-8, where it Judges if the operation should be terminated. When a command for terminating the operation is received, the process is terminated while when the command for terminating the operation is not received, CPU 1 returns to step 3-1, again.

When CPU 1 Judges at step 3-2 that punch-in or punch-out is to be executed, the operation goes to step 3-3, where data reproducing operation starts for reproducing data for designating a punch-in point and a punch-out point. The data may be either edited data or nonedited data.

At step 3-4 a key scanning is effected, designating the punch-in point and punch-out point. The punch-in point and punch-out point are designated in terms of time or timing at which predetermined keys of the keyboard 4 are operated. Since, once the punch-in point and punch-out point are fixed, relevant positions on an absolute time axis are determined, a timer interrupt will be set for switching the operation mode from the reproducing mode to the recording mode and vice versa, i.e., a time is set for executing the timer interrupt process shown in FIG. 5, as will be described later.

The operation goes to step 3-5, where an area for storing punch-in data is secured on the hard disk 12. This area is set in accordance with a time length between the punch-in point and the punch-out point. The area for storing punch-in data which is provided separately from a track to be punched in allows punch-in to be canceled easily. When the area for storing punch-in data has been secured, the operation goes to step 3-6, where an editing process for punch-in or punch-out is executed (the reproducing operation starts). Switching operation for A/D conversion or D/A conversion and control operation of the buffer data to be executed before and after the punch-in point or the punch-out point are executed in the hard disk transfer termination interrupt process of FIG. 4 and the timer interrupt process of FIG. 5.

When the editing process for punch-in or punch-out is finished, the operation goes to step 3-7, where a play-back schedule table for events generated by punch-in and punch-out is prepared and modified. Thereafter, the play-back operation is executed in accordance with the play-back schedule written in the play-back schedule table, and the audio signal subjected to the punch-in and punch-out edition may be reproduced. If a user of the recorder founds it necessary to edit the audio signal again, after listening to the reproduced audio signal, the similar operation will be repeated. Since punch-in data is not written over the original audio signal but the data is stored in a separate area, a re-edition of the audio data may be easily effected. Then, the operation goes to step 3-8, where it is judged if a command for termination is issued. If the command for termination is issued, the operation is terminated, and if such a command is not issued, the operation returns to step 3-1.

With reference to the flowchart of FIG. 4, the interrupt routine process for terminating the hard disk transfer will be described. This process is executed as an interrupt each time when the transfer process of data of the hard disk 12 is finished.

At step 4-1, it is judged whether or not a data transfer request is made. That is, when a process is judged to be effected prior to other processes, CPU 1 issues the data transfer request to the DMA controller 10 in a similar manner to that at step 5—5 of FIG. 5 (to be described later). Then, the operation goes from step 4-1 to step 4-15, where data transfer is effected prior to other process in accordance with the data transfer request. The process to be executed prior to others is data transfer process for transferring unrecorded-data to the hard disk 12, data which remains in the buffer, for example, at punch-out. This process will be described in detail later with reference to step 5-5 of FIG. 5.

When it is judged at step 4-1 that no data request is issued, the operation goes to step 4-2, where a transfer-track is selected. A priority order of the channels on the transfer-track is set as follows: from CH1 to CH5. Before the operation goes into the interrupt routine process, the transfer-track is selected in accordance with the priority order. Then, the operation goes to step 4-3, where it is Judged to which operation mode the selected track is set. When the selected track is set to the play back mode, processes of steps 4-4 to 4-7 are executed while the track is set to the recording mode, processes of steps 4-8 to 4-14 are executed.

When the transfer-track is in the play back mode, at step 4-4 an empty capacity of the buffer among the buffers 9-1 to 9-4 which belongs to the channel corresponding to the transfer-track is calculated from the start address and the current address of this buffer, and number of data is decided based on the calculated empty capacity so that data of an amount corresponding to the empty capacity can be transferred from the hard disk 12 to the buffer. The operation goes, if necessary through steps 4-5 and 4-6 to be described later, to step 4-7, at which the hard disk controller 11 is programmed allowing data to be transferred to the buffer through the channel CH5. As a result, data of the number decided at step 4-4 to be transferred is transferred from the hard disk 12 to the buffer which is selected from among the buffers 9-1 to 9-4 for receiving data.

At steps 4-5 and 4-6, the following processes, if necessary, will be executed: That is, the sum of the present time and the time duration for play back of the transferred data is compared with a punch-in time at step 4-5. When the sum of the present time and the duration for play back of the transfer data is equivalent to or shorter than the punch-in time, that is, when the punch-in time is not exceeded, even though data of the number decided at step 4-4 should be transferred, the process at step 4-6 will be skipped. When the sum of the present time and the duration of play back of the transfer data exceeds the punch-in time, the operation goes to step 4-6, where the number of data decided at step 4-4 is rearranged to a number which will not exceed the punch-in time. During the process, an overhead at data transfer can be optimized.

When it is still off from the punch-in time or the punch-out time, or when a track to which data is to be transferred is not designated for punch-in or punch-out, a normal play back operation will be executed. In the normal play back operation, the processes at steps 4-4 to 4-7 are repeatedly executed, and a block transfer of play back data is executed to respective tracks (the audio I/O devices 8-1 to 8-4) in a time sharing manner. During data transfer from the hard disk 12 to the buffers, audio data are output in parallel to the tracks of the respective channels in the time sharing manner. The current address pointer of the buffer is incremented every input/output of one sample data.

Meanwhile, when it is judged at step 4-3 that the transfer-track is in the recording mode, the operation goes to step 4-8, where the difference between the time of punch-out point and the present time is compared with a time duration (capacity) of a buffer (transfer buffer) which data is to be transferred to or from. When the difference between the time of the punch-out point and the present time is equivalent to or longer than the time duration (capacity) of the buffer, i.e., when time longer than one cycle of the buffers is left before the punch-out point, the operation goes to step 4-13, where a number of data is decided from the start address and the current address of the buffer of the relevant channel. In other words, an amount of data which are left in the buffer and are not yet transferred is calculated, and a number of data to be transferred to the hard disk 12 is decided from the calculated amount of data. Then, the operation goes to step 4-14, where data the number of which is decided at step 4-13 to be transferred is transferred from the transfer buffer among the buffers 9-1 to 9-4 to the track of the relevant channel of the hard disk 12 and is stored thereon by the operation of the channel CH5 between the DMA controller 10 and the hard disk controller 12.

When it is judged at step 4-8 that the difference between the time of the punch-out point and the present time is shorter than the time duration (capacity) of the buffer, i.e., when only time shorter than one cycle of the buffers is left before the punch-out point, the processes at steps 4-9 to 4-12 are executed. It is judged at step 4-9 if data to be reproduced is read out before the time of punch-out point is reached. When the data is not read out in advance, the operation goes to step 4-10, where a number of data to be read out in advance is decided from the punch-out time (represented by T shown in Time A of FIG. 9B at an address which the current address will have reached at the punch-out time) and the present start time. The start address is updated every time data is read out from the buffer to the hard disk 12. The current address is updated every time data is read out from the audio I/O devices and is written into the buffer. An empty capacity which allows data to be read out in advance is therefore decided from the current address at the punch-out time and the present start address.

When a time approximately equivalent to one cycle of the buffer is left even though a time not longer than one cycle of the buffer should be left before the punch-out point, the empty capacity of the buffer is not yet enough. In this case, an amount of data to be transferred therefore is small, too. In such a case that the amount of data to be transferred is, for example, of nearly several microseconds, when the access time for the hard disk 12 is taken into consideration, it will be more efficient to transfer remaining data (unrecorded data) in advance to secure a larger empty capacity before executing a previous data reading operation. It is judged at step 4-11 if the number of data decided at step 4-10 to be transferred is enough with respect to an access time for the hard disk 12. When it is judged that the number of data is not enough, the operation goes through step 4-13 to step 4-14, where data in the buffer memory is transferred to the hard disk 12 (the recording operation continues).

When an enough empty capacity is left in the buffer, the operation goes through step 4-11 to step 4-12, where previous data reading operation and data transfer are effected. More specifically, when it comes close to the punch-out time, data for play back are read out in advance, and are sequentially written into the buffer from a buffer address, which corresponds to a Time T (shown in Time B of FIG. 9B) at which the recording mode is switched to the play back mode. In this case, since the start address (the start address in Time B of FIG. 9B) will be a start address at which the normal play back mode starts after the punch-out, this start address is stored.

In this manner, when a track transfer order of the track is reached again by the punch-out time while the previous data reading operation is being effected, it is judged at step 4-9 that the previous data reading operation was already effected, and the operation goes to the processes at steps 4-13 and 4-14, which occurs between Time B and Time C.

The timer interrupt routine process will be described with reference to FIG. 5. This timer interrupt routine process is set at step 3-4 of FIG. 3, and is executed when the punch-in time and punch-out time are reached.

At step 5-1, it is judged if which operation, punch-in or punch-out is to be executed. When it is judged that the punch-in operation is to be executed, the operation goes to step 5-2, where a direction of data transfer on the DMA channel corresponding to a target track is reversed. That is, the data is transferred from the buffer to the audio I/O device up to now, but the direction of the data transfer is changed and data is now transferred from the audio I/O device to the buffer. The relevant audio I/O device is switched in its operation from the D/A conversion to the A/D conversion accordingly. Assuming that, for example, the first track is designated as a track for punch-in and punch-out, data was previously transferred from the buffer 9-1 to the audio I/O device 8-1, and when the data transfer direction is switched, then data is transferred in an opposite direction from the audio I/O device 8-1 to the buffer 9-1. The audio I/O device 8-1 is changed from the D/A conversion to the A/D conversion accordingly.

Then, the operation goes to step 5-3, where the start address is set to the present current address (Time b of FIG. 9A).

When it is judged at step 5-1 that the punch-in operation is to be executed, the operation goes to step 5-4, where a direction of data transfer is reversed on the DMA channel corresponding to a target track for punch-in and punch-out (the first track in the above embodiment). That is, data was previously transferred from the audio I/O device to the buffer, and when data transfer direction is switched, then data is transferred in an opposite direction from the buffer to the audio I/O device. In the above embodiment, when data transfer direction is not switched, data is transferred from the audio I/O device 8-1 to the buffer 9-1 but data transfer is switched in direction such that data is transferred in a reverse direction from the buffer 9-1 to the audio I/O device 8-1. The hard disk controller 11 is programmed during the processes at steps 4-10 to 4-12 of FIG. 4, such that the data which were previously read out to the buffer 9-1 are reproduced after the punch-out time.

The operation goes to step 5-5, where CPU 1 sends the DMA controller 10 a transfer request concerning unrecorded portion. More specifically, since data left in the buffer at the punch-in time are those which were recorded on the first track of the hard disk 12, and were read out and transferred, these data may be nullified without causing any trouble. Data left in the buffer at the punch-out time, however, are used for substitution so that they can not be put aside. CPU 1 issues at a certain time the transfer request for transferring these data to the hard disk 12 prior over other data. In response to the transfer request, the processes at steps 4-1 though 4-15 of FIG. 4 are executed to transfer the data left in the buffer to the hard disk 12.

At step 5-6, the start address stored in the previous data reading operation at step 4-12 is set to the present start address (Time C of FIG. 9B). In the normal play back mode, soundless data are sequentially read out from addresses following the start address ever afterward. If the start address is not revised, i.e., if the start address is not set to the present address, the empty capacitor in the buffer will be set as being smaller than the actual empty capacity. To avoid this discrepancy, the start address is revised.

The above described timer interrupt process is completed within a sampling time interval (if the sampling frequency is 48 KHz, the sampling time interval will be approximately 21 microseconds), the punch-in and punch-out may be executed with accuracy of the sampling time.

Even if the above described timer interrupt process is not completed within a sampling time interval, a fine address adjustment may be executed in proximity of the editing point by the normal edition because the punch-in data and the original data are decided.

Since both the timer interrupt and the hard disk transfer interrupt access to the start address, these interrupts will not occur in a multiple fashion. Both the interrupts take time only for rewriting some registers in the DMA controller 10 and the hard disk controller 11 so that operation is not appreciably affected.

Figure 10:
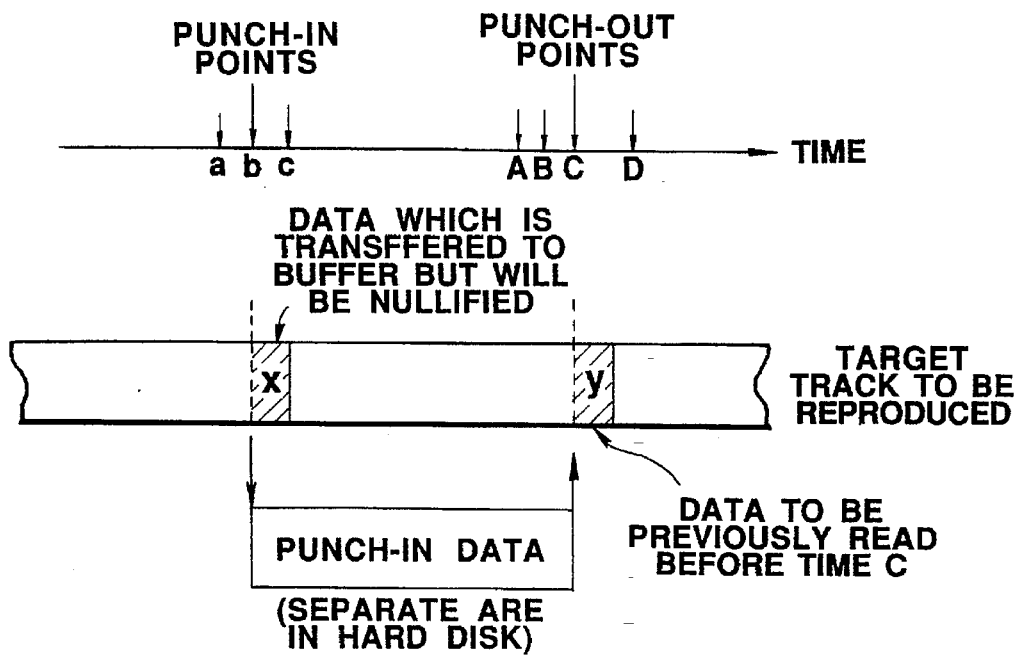
FIG. 10 is a view illustrating operation of a hard disk in the first embodiment.

The above mentioned punch-in and punch-out process will be described with respect to operation of the hard disk 12 shown in FIG. 10. When the relevant track is reproduced and the punch-in time b is reached, the reproducing operation for the track stops. At the punch-in time b, data between the punch-in time b and a certain time c is already stored in the buffer, but the data x will not be used for sounding, resulting in nullify. After the punch-in time b, externally supplied punch-in data is recorded on a separate track (area) other than the play back track (punch-in track).

When it is judged at a time A, a certain time before the punch-out time C, that the punch-out track will be reached within one cycle of the buffer, while punch-in data is recorded, data y which will be reproduced after the punch-out time C is decided to be read in advance. This previous data reading operation will be executed at the time B, a certain time before the punch-out time C. When the punch-out time is reached, the data y read out previously is read out from the buffer, and thereafter data reproduced from the play back track are sequentially transferred to the buffer and further the data are transferred from the buffer to the audio I/O device. In the meantime, the punch-in data written into the buffer at the punch-out time C is read out at a certain time after the punch-out time C and is recorded on the above mentioned area of the hard disk 12.

The operation will be described in connection with the buffer referring to FIGS. 9A and 9B. FIG. 9A is a view showing operation executed in proximity to the punch-in time while FIG. 9B is a view showing operation executed in proximity of the punch-out time.

As shown in FIG. 9A, data reading operation for sounding starts with the start address and stops at the current address at the time a before the punch-in time b. Data (stored in a hatched area in FIG. 9A) to be read out after the current address is not yet sounded (is not yet input to the audio I/O device). This current address is an address which is to be accessed for A/D conversion (or D/A conversion). In FIG. 9A, a character t stands for a position (address) which the current address will reach at the punch-in time.

At a time b (punch-in time), the current address will reach the position t. At this time, data written in addresses following the current address will be nullified, and the current address will be set as the start address. Then, unrecorded data will be sequentially stored in the area of the buffer, starting at the start address as shown at Time c of FIG. 9A. The unrecorded data are sequentially read out from the buffer starting at the start address with a given timing and are stored as punch-in data in a predetermined area of the hard disk 12.

At the punch-out time, previous data reading operation for play back data is decided, when it is judged at the time A that the punch-out time C will reach within one cycle of the buffer. In FIG. 9B, a character T denotes a position (address) which the current address will reach at the punch-out time C.

In response to the decision of the previous data reading operation at the time A, data (data y in FIG. 10) read out previously are written as unsounded data into the buffer at the time B before the punch-out time C. Data are written in the buffer, starting at the position T to the start address.

When the time C (the punch-out time) is reached, the current address reaches the position T. At this moment, the start address locates at a foremost address of the unrecorded data to be recorded thereafter and this start address is changed to the last address of the unsounded data (the foremost address of data to be read in advance). The unrecorded data z is data which was written into the buffer but is still left in the hard disk. The data z will be transferred prior to other data at steps 4-1 and 4-15 of FIG. 4 when the transfer request is issued at step 5-5 of FIG. 5.

At the time D after the punch-out C, the normal reproduction is executed, and unsounded data are sequentially written to the start address and data at the current address are sequentially read out.

<Operation of Audio I/O Devices 8-1 to 8-4>

Operation of the audio I/O devices 8-1 to 8-4 will be described with reference to FIG. 6. This flowchart may be realized by either microprogram control or hard logic control, and there are various types of means for available to accomplish the function.

It is judged at step 6-1 if the signal CS for designating the audio I/O device has been sent from CPU 1, i.e., if the signal is active. When it is judged that the signal is active, the operation mode (record, play back, stop etc.) is set by CPU 1 at step 6-2.

When the judgement is negative at step 6-1, judgement is made at step 6-3 whether the audio I/O devices 8-1 to 8-4 are in the record mode or the play back mode. When the devices are in the record mode, the operation is advanced to execute the processes at step 6-3 to steps 6-4 to 6-9, while, when the devices are in the play back mode, then the operation is advanced to execute the processes at steps 6-10 to 6-15.

Operation of the audio I/O devices which are set to the record mode will be explained at first. It is judged at step 6-4 whether or not the sampling time is reached, and the process of step 6-4 will be repeatedly executed until the sampling time is reached. Judgement on whether or not the sampling time is reached may be made based on either outputs of hard timers provided in the respective audio I/O devices 8-1 to 8-4 or an output of a common hard timer provided for the audio I/O devices. As will be clear from the later description, the sampling frequencies of the audio I/O devices 8-1 to 8-4 may set different from one another.

When the result of the judgement at step 6-4 is "YES", an input analog audio signal is subject to sample hold (S/H) and is converted to a digital audio signal at step 6-5. At step 6-6, the audio I/O devices make the DMA transfer request signals DRQ active and send them to the DMA controller 10.

Upon receipt of the active DMA transfer request signals DRQ, the DMA controller 10 outputs response signals DAK to effect DMA transfer, as will be described in detail later. When the judgement at step 6-7 is affirmative (YES), the audio I/O devices 8-1 to 8-4 therefore goes to step 6-8, where they output the digital audio signals obtained at step 6-5 to the corresponding buffers 9-1 to 9-4 via the data bus, respectively. At step 6-9, the audio I/O devices 8-1 to 8-4 make the DMA transfer signal DRQ inactive. The analog audio signal externally supplied is converted into the digital audio signal every sampling period and the digital audio signal is transferred to the current address of the buffer which is selected from among the buffer 9-1 to 9-4 by the DMA controller 10.

Meanwhile, when it is judged at step 6-3 that the audio I/O devices 8-1 to 8-4 are in the play back mode, the operation goes to step 6-10, where the audio I/O devices 8-1 to 8-4 make active the DMA transfer request signals DRQ to the DMA controller 10. Receiving the response signals DAK from the DMA controller 10 at step 6-11, the audio I/O devices retrieve the digital audio signals on the data bus at step 6-12, and then make the above DMA transfer request signals DRQ inactive at step 6-13. Though operation of the DMA controller 10 at this time will be described later, the contents of the current addresses (where contents in areas of the tracks Tr1 and Tr2 of the hard disk 12 have been transferred and stored) of the buffers 9-1 and 9-2 corresponding to the tracks Tr1 and Tr2 respectively will be input and set to the audio I/O devices 8-1 and 8-2 through the processes at steps 6-10 to 6-13. At step 6-14, it is judged if the sampling time is reached. The meaning of the detection of the sampling time is same as at step 6-4.

When the judgement at step 6-14 is affirmative (YES), the operation goes to step 6-15, where the digital audio signals are subject to D/A conversion and low pass filtering, and then output externally as an analog audio signal.

The operations of the audio I/O devices at one sampling time, devices which are in the record mode and in the play back mode have been described. After executing the processes at steps 6-9 and 6-15, the audio I/O devices returns to step 6-1 and will execute the processes for the following sampling times in the same manner.

<Operation of DMA Controller 10>

The operation of the DMA controller 10 will be described with reference to FIG. 7. The flowchart of FIG. 2 may illustrate that the service controller 108 of FIG. 2 operates under control of the microprogram control, or that the DMA controller 10 realizes its function by a hardware logic.

It is judged at step 7-1 if the designating signal CS has been supplied from the CPU 1 (i.e., if the signal CS has been made active). When the signal CS is active, it is judged at step 7-2 which signal, a read signal RD or a write signal WR, is supplied from the CPU 1. When the read signal RD is supplied, the operation goes to step 7-3, where the contents of the registers 104, 105, which are designated by the address signals supplied via the address bus are output onto the data bus, so that the CPU 1 can read them. When the write signal WR is supplied, the operation goes to step 7-4, where the desired data will be set to the designated register via the data bus. The desired data therefore will be set to the registers 104 and 105 through the process at step 7-4, respectively.

When the CPU 1 terminates the accessing to or the programming of the DMA controller 10, the designating signal CS is set inactive, and the operation goes from step 7-1 to step 7-5.

It is judged at step 7-5 if the DMA transfer request signals DRQ1 to DRQ4 are supplied from the respective audio input/output devices 8-1 to 8-4, or if the DMA transfer request signal DREQ (DRQ5) is supplied from the HD controller 11. When the request signal is sent from any of the components, the operation goes to step 7-6, where the DMA enable signal DMAENB is set to "1" or active. Only the DMA controller 10 uses the address bus and the data bus in the DMA unit, disabling any access from the CPU 1.

When multiple requests are made, the DMA controller 10 successively selects channels at step 7-7 in priority order of the channel, from CH1 down to CH4. When, for instance, the data transfer requests are simultaneously made from the audio I/O devices 8-2 and 8-3 of the Tr2 and Tr3 immediately after the sampling operation, the DMA transfer of the CH2 is executed first because the Tr2 is given priority over the Tr3. As will be understood from the later description, since the CH5 is given the lowest priority, when a data transfer request is made from any of the audio I/O devices 8-1 to 8-4 while the data transfer is going on between the hard disk 12 and one of the buffers 9-1 to 9-4, the data transfer to the audio I/O devices will be carried on by priority.

Then, the DMA controller 10 outputs at step 7-8 the current address (the content of the current address register of CH2 of the address register 104) of the selected channel (the CH2 in this case) to the address bus. Referring to the content of the control register 105 of the selected channel (CH2 in this case), the DMA controller 10 decides at step 7-9 in which direction the DMA transfer is to be effected. When the DMA controller 10 decides to transfer data from the buffers 9-1 to 9-4 to the other components (I/O), the operation goes from step 7-10 to step 7-11, where the DMA controller 10 supplies the read signal RD to the buffer selected from among the buffers 9-1 to 9-4. When the data is to be transferred from the other components (I/O) to the buffers 9-1 to 9-4, the operation goes to step 7-12, where the DMA controller 10 supplies the write signal WR to the relevant buffer.

At step 7-13 the response signal DAK is made active. As a result, the audio data read out from the current address area of the buffer 9-2 will be sent to the data bus in the processes at steps 6-11 and 6-12 of FIG. 6, and will be supplied to the audio I/O devices 8-2 and 8-3.

At step 7-14, since the data transfer has been terminated, the read signal RD or the write signal WR, and the response signal DAK are set inactive. At step 7-15, the DMA controller 10 increments the content at the current address (in the address register 104 of FIG. 2) of the channel (CH2 in this case) by one. This content at the current address (in the address register 104) of the channel (CH2) is to be increased through the process at step 7-15, every time other sampled audio data is written into or read out from the buffers 9-1 to 9-4. The operation returns from step 7-15 to step 7-1.

If the audio I/O devices 8-2 and 8-3 in the play mode of Tr2 and Tr3 have made request for data transfer to the DMA controller 10, it will be judged affirmative (YES) at step 7-5 because the data transfer has been executed only in Tr2. Through the processes at steps 7-7 to 7-10, 7-12 to 7-15, data is transferred in Tr3 from the buffer 9-3 to the audio I/O device 8-3 in the same manner as above.

After the data transfer is terminated, the operation advances from step 7-5 to step 7-16, where the DMA controller 10 sets the DMA enabling signal to "0" (inactive). Then, the DMA controller 10 is prohibited from occupying the data bus and the address bus in the DMA unit, allowing the CPU 1 to access these buses.

With respect to the Tr2 and Tr3, the description of the data transfer from the buffers 9-2 and 9-3 to the respective audio I/O devices 8-2 and 8-3 has been given. Concerning the track in the record mode, the DMA controller 10 executes data transfer in the opposite direction, i.e., from the audio I/O devices 8-1 to 8-4 to the buffers 9-1 to 9-4.

Figure 6:
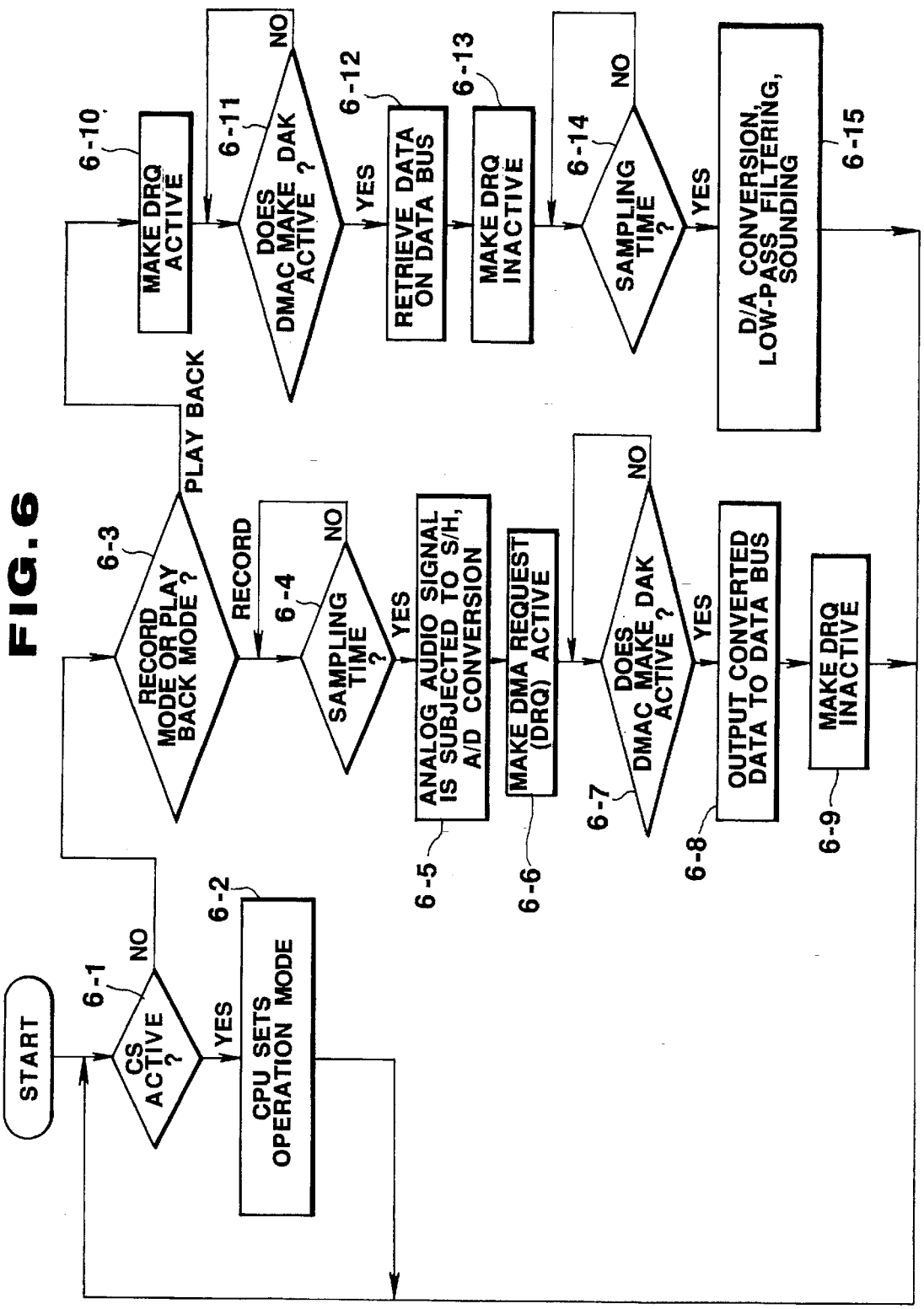
FIG. 6 is a flowchart illustrating operation of an audio input/output device in the embodiment of FIG. 1.

When any of Tr1 to Tr4 is in the play mode, the audio I/O devices 8-1 to 8-4 corresponding to Tr1 to Tr4 respectively output the request signals DRQ to the DMA controller 10 during the period between the sampling times t and t+1 (at step 6-10 of FIG. 6).

In response to the request signals DRQ, the DMA controller 10 performs the processes at steps 7-5 to 7-7 in the same manner as done above, and supplies at step 7-8 the audio I/O devices 8-1 to 8-4 through the address bus with address data indicating addresses from which data are to be read out from the buffers 9-1 and 9-2. After execution of the processes at steps 7-9 and 7-10, the DMA controller 10 advances to step 7-11, where it supplies the read signals RD to the buffer 9-1 and 9-2. At step 7-13, the DMA controller 10 sets the response signal DAK to "1".

As a result, the digital audio data at the designated address of the buffer 9-1 will be transferred to and written into the audio I/O devices 8-1 of Tr1 and 8-4 of Tr4 via the data bus while the digital audio data at the designated address of the buffer 9-2 will be transferred to and written into the audio I/O devices 8-2 of Tr2 and 8-3 of Tr3. Executing the processes at steps 7-14 and 7-15, the DMA controller 10 returns to step 7-1.

The DMA controller 10 executes data transfer between the hard disk 12 and the buffers 9-1 to 9-4, using the address register 104 and the control register 105 in the channel CH4. This operation will be carried out after the CPU 1 performs the interrupt routine operation of FIG. 4, setting and controlling the DMA controller 10 at steps 4-2, 4-4, 4-10 and 4-14, and programming the HD controller 11 at steps 4-7, 4-12, and 4-14.

The CPU 1 sets and controls the DMA controller 10 at steps 4-2, 4-4, 4-10 and 4-13 while the DMA controller 10 performs the processes at steps 7-3 and 7-4 in response to the above operation of the CPU 1. More specifically, the CPU 1 decides a track to which data is to be transferred through the channel CH5, and sets the start address (i.e., the address following the address of the block data which has previously been transferred between the buffer and the hard disk 12) of the buffer corresponding to the track decided above to the start address register (the address register 104 of FIG. 2) of CH5. The CPU 1 obtains the number of data to be transferred in the track this time from the difference between the start address and the current address (the address incremented after the previous data transfer is executed between the buffer and the hard disk 12), and copies the current address in this track to the start address.

The CPU 1 will execute data transfer between the buffers 9-1 to 9-4 corresponding to the tracks in operation and the hard disk 12 sequentially track by track, and will execute for each track the data transfer following the previous data transfer (block transfer). In the instance of Time a shown in FIG. 9A, data of an amount which corresponds to the empty space (blank space) between the start address and the current address shown at Time b will be transferred from the hard disk 12 to the buffer. (With respect to the tracks in the record mode, it will be apparent that, though the direction of the data transfer is opposite, data transfer will be executed from the buffers to the hard disk 12 under control of the DMA controller 10.)

The CPU 1 programs the HD controller 11 at steps 4-7, 4-12 and 4-14, and then allows the HD controller 11 to actually issue a data transfer request for starting the DMA transfer.

Detecting the data transfer request made by the HD controller 11 at step 7-5, the DMA controller 10 performs the processes at steps 7-6 to 7-9 as done above, and then goes to step 7-10, where it judges whether the data transfer from the buffers 9-1 to 9-4 to the hard disk 12 is requested or the data transfer in the opposite direction is requested. When the former transfer is requested, the operation goes to step 7-11. When the latter transfer is requested, the operation goes to step 7-12, and then the processes at steps 7-13 to 7-15 are executed. In this case, since digital audio data in one sampling is transferred in a single transfer operation, the block transfer will be done by repeatedly executing the processes at steps 7-5 to 7-15 for several times. The data transfer between the hard disk 12 and the buffers 9-1 to 9-4 will be further described later because the operation of the HD controller 11 is involved greatly.

When the DMA transfer is completed, the transfer requests DRQ1 to DRQ5 will not be sent forth, and the operation advances from step 7-5 to step 7-16, where the DMA controller 11 sets the DMA enabling signal DMAENB to "0" (inactive).

<Operation of HD Controller 11>

The operation of the HD controller 11 will now be explained referring to FIG. 8. The HD controller 11 may be realized by either a hardware logic or microprogram control; in either case, the operational flow in FIG. 8 can be accomplished.

First, it is judged at step 8-1 whether or not the designation signal CS has been given from the CPU 1; this signal CS is applied in the interrupt routine of the CPU 1 (at steps 4-7, 4-12 and 4-14 of FIG. 4). If the result of the judgement is negative (NO), the operation returns to step 8-1 again, but if the result of the judgement is affirmative (YES), the operation goes to step 8-2. At this step 8-2, it is judged whether the read signal RD or the write signal WD is sent from the CPU 1. If it is the read signal RD, the designated data in the HD controller 11 (the content of the address register or the like) is sent through the data bus to the CPU 1 at step 8-3.

If the write signal WR has been given from the CPU 1, the operation advances from step 8-2 to step 8-4, where the direction of DMA transfer between the buffer and the hard disk 12 is set, the DMA transfer which is to be executed at present through the channel CH5 of the DMA controller 10. At the next step 8-5, the access point of the hard disk 12 to be accessed is set by the access pointer for the track which the CPU 1 has acquired from the RAM 3.

At the subsequent step 8-6, the number of data to be transferred (the number of digital audio data) is set in an internal counter of the HD controller 11. This number of data is obtained in the interrupt routine processes of the CPU 1 at steps 4-7, 4-12 and 4-14.

In the processes at steps 8-4 to 8-6, the HD controller 11 is programmed under control of CPU 1. Then, the HD controller 11 requests the DMA controller 10 for data transfer at step 8-7. It will be understood from the above that upon receipt of the interrupt signal INT from the HD controller 11, CPU 1 executes the setup and control for the DMA transfer associated with the next track (in the order of the Tr1, Tr2, Tr3, Tr4, Tr1, . . . provided that the Tr1 to Tr4 are all presently enabled) in the DMA controller 10. Then, CPU 1 leaves from the HD controller 11 and DMA controller 10, permitting these controllers to perform the DMA transfer through the mutual interaction.

Figure 7:
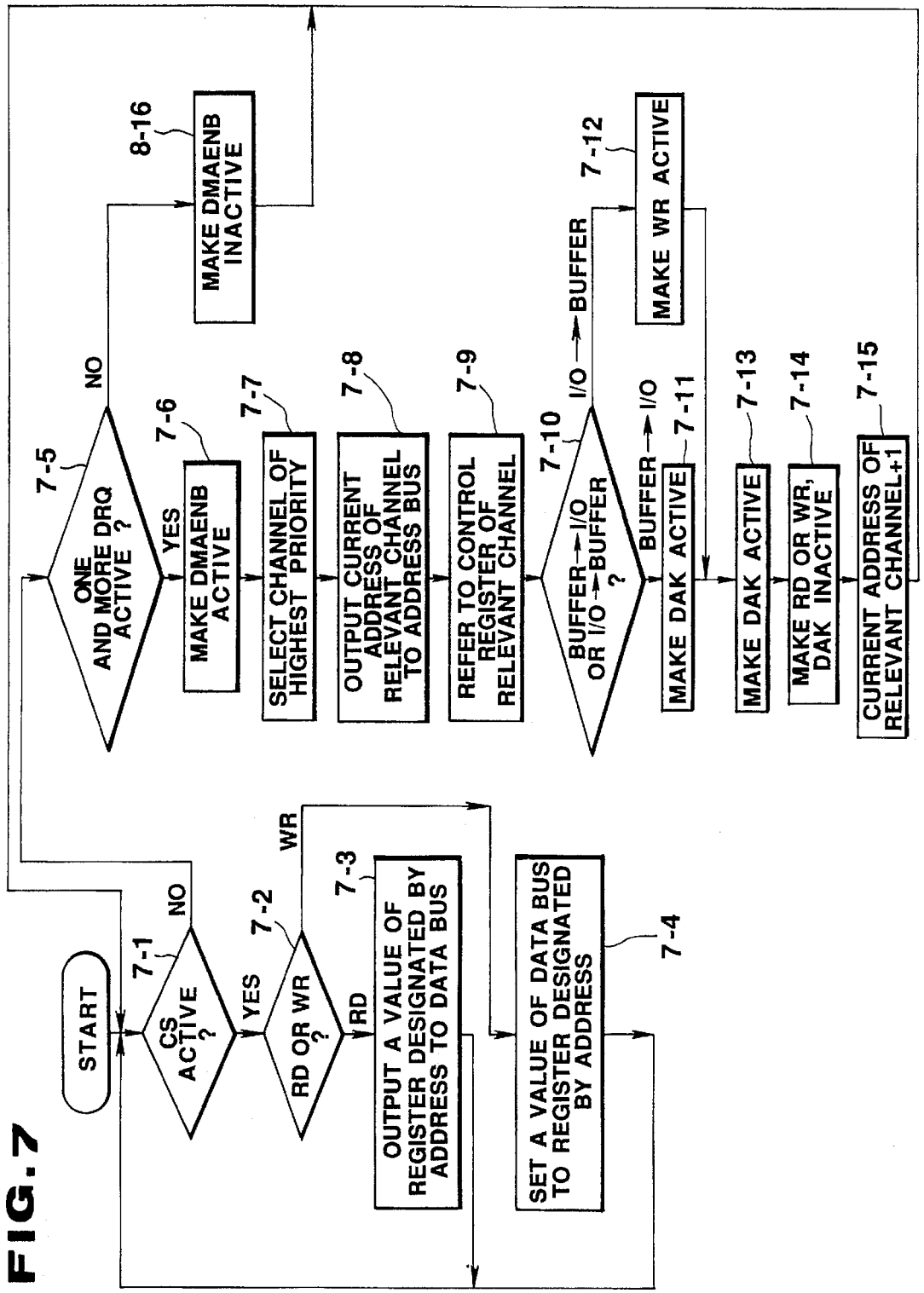
FIG. 7 is a flowchart illustrating operation of DMA controller in the embodiment of FIG. 1.

The HD controller 11 moves from step 8-7 to 8-8, where the HD controller 11 repeatedly executes the process of step 8-8 until it receives the response signal DACK (DAK5) from the DMA controller 10 (see step 7-13 of FIG. 7).

When the judgment at step 8-8 becomes affirmative (YES), the operation advances to step 8-9, where digital audio data in one sampling is transferred through the operation of the CH4 of the DMA controller 10, and the transfer counter set at step 8-6 is decremented at step 8-10 by "1". According to the content of the transfer counter, it is judged at step 8-11 whether a preset number of data has been transferred. When the judgment is negative (NO), the operation returns to step 8-8. The DMA controller 10 therefore receives repeatedly the transfer requests DRQ5 until the transfer of the preset amount of data (block transfer) from the HD controller 11 is completed. In response to the transfer request, the DMA controller 10 executes the processes at steps 7-5 to 7-15 while HD controller 11 performs the processes at steps 8-8 to 8-11.

When it is judged at step 8-11 that the data transfer has been completed, the operation moves to step 8-12, where the data transfer request signal DREQ (DRQ5) from the HD controller 11 to the DMA controller 10 is set to "0" (inactive). The HD controller 11 sends the interrupt signal INT to CPU 1 at step 8-13 to allow data for the next track to be transferred between the hard disk 12 and one of the buffers 9-1 to 9-4. In response to this interrupt signal, CPU1 executes the interrupt routine process of FIG. 4 as described above.

<Operation of Data Transfer Between Hard Disk 12 and Buffers 9-1 to 9-4>

The data transfer between the hard disk 12 and the buffers 9-1 to 9-4 will be understood from the above explanation and a description will now be given of how the DMA request is made to the DMA controller 10 and how the DMA controller 10 responds to the request in a timesharing manner.

For example, when any of Tr1 to Tr4 (the audio I/O devices 8-1 to 8-4) is set in the play mode, every sampling time the audio I/O devices 8-1 to 8-4 send data transfer request signals to the DMA controller 10 for data transfer between the hard disk 12 and the buffers 9-1 to 9-4.

Figure 8:
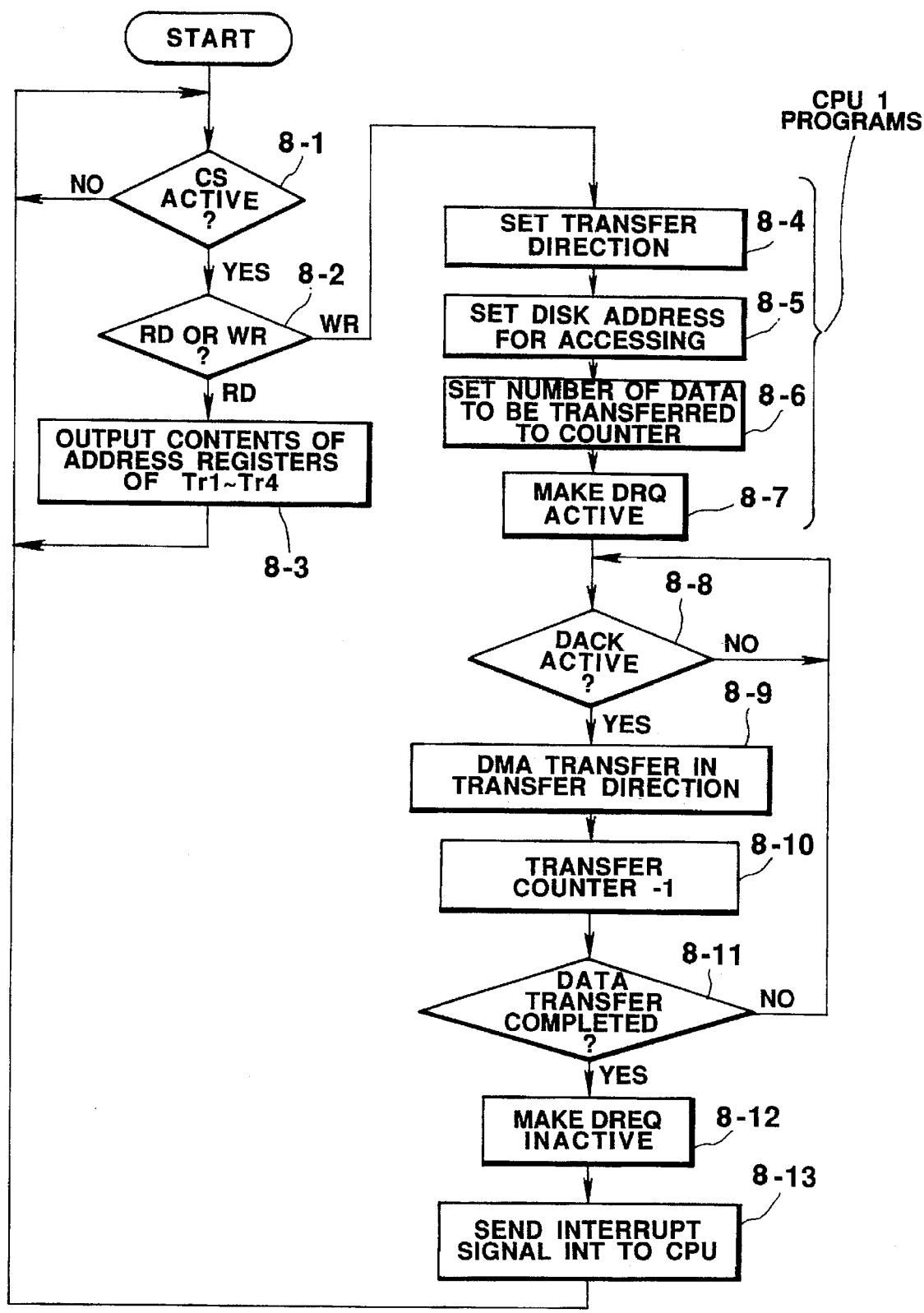
FIG. 8 is a flowchart illustrating operation of a hard disk controller in the embodiment of FIG. 1.

This data transfer request is also made while CPU 1 is programming the HD controller 11 (at steps 4-7, 4-12 and 4-14 of FIG. 4 and at steps 8-1 to 8-4 of FIG. 8). Upon receipt of the data transfer request signals from the audio I/O devices 8-1 to 8-4, the DMA controller 10 outputs the DMA enabling signal DMAENB at step 7-6 of FIG. 7 as described above, interrupts programming the HD controller 11 by CPU 1 (WAIT) and allows CPU 1 to start programming the HD controller 11 again after the DMA transfer through the respective channels CH1 and CH2 is completed.

While the data transfer between the hard disk 12 and the buffers 9-1 to 9-4 is executed by the DMA transfer through the channel CH5, the audio I/O devices 8-1 to 8-4 send data transfer request signals every sampling time. In this case, the DMA controller 10 will execute data transfer for the channel of higher priority over others in accordance with the judgement made at step 7-7 of FIG. 7. Since the HD controller 11, though it keeps sending the data transfer request signal DRQ5 to the DMA controller 10 (see step 8-7 of FIG. 8), does not receive any response signal DAK5, the HD controller 11 will repeat the process of step 8-8, waiting the following data transfer.

Macroscopically, the DMA controller 10 repeats DMA transfer (block transfer) between Tr1 to Tr4 and the hard disk 12 and the buffers 9-1 to 9-4. Microscopically, however, even during programming of the HD controller 11, the actual DMA transfer (through CH5) or a pause (idling), the DMA controller 10 executes every sampling time DMA transfer (single transfer) through the channels CH1 to CH4 between the buffers 9-1 to 9-4 and the audio I/O devices 8-1 to 8-4. The DMA controller 10 is arranged to sufficiently deal with high-speed A/D conversion and D/A conversion every sampling time.

<Second Embodiment>

A second embodiment of the preset invention will now be described. In the embodiment shown in FIGS. 4, 5, 9 and 10, the punch-in time and the punch-out time are previously set at predetermined times, respectively, so that data can be read before the punch-out time is reached. But, in case that the punch-in and punch-out are effected by input key triggers at given times during reproduction of an audio signal, it is impossible to tell when the punch-out will occur. As a result, it is hard to prepare reproduction data before hand. Even though the operation is changed to the play back mode, to prepare the reproduction data each buffer will be delayed by a time for accessing the disk before starting data transfer. Since the current address of the reproduction indicates data which was previously recorded until the reproduction data corresponding to the delayed time (for example, several tens ms.) is transferred, noises are consequently generated during the period corresponding to the delayed time. A number of punch-in and punch-out editing operations can accumulate time differences between reproduction time-axes of respective tracks.

To solve the above drawbacks, the processes as shown in FIGS. 11 to 16 may be employed in the second embodiment.

Figure 11:
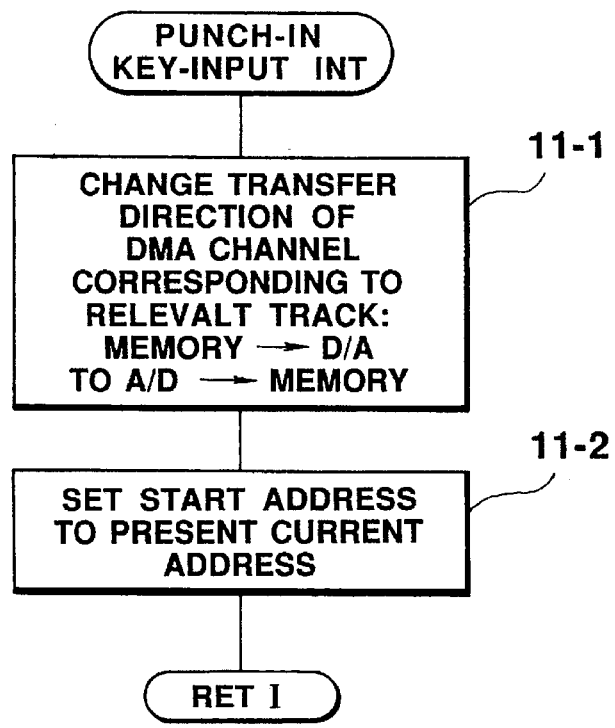
FIG. 11 is a flowchart illustrating an interrupt routine process of punch-in key input in a second embodiment.

The main routine process of the second embodiment is equivalent to that shown in FIG. 3. An interrupt routine process at the punch-in is shown in FIG. 11. The processes of a punch-in key-input interrupt routine at steps 11-1 and 11-2 are the same as those at steps 5-2 and 5-3 of FIG. 5. That is, the punch-in process at the key input is the same as that described above.

Figure 12:
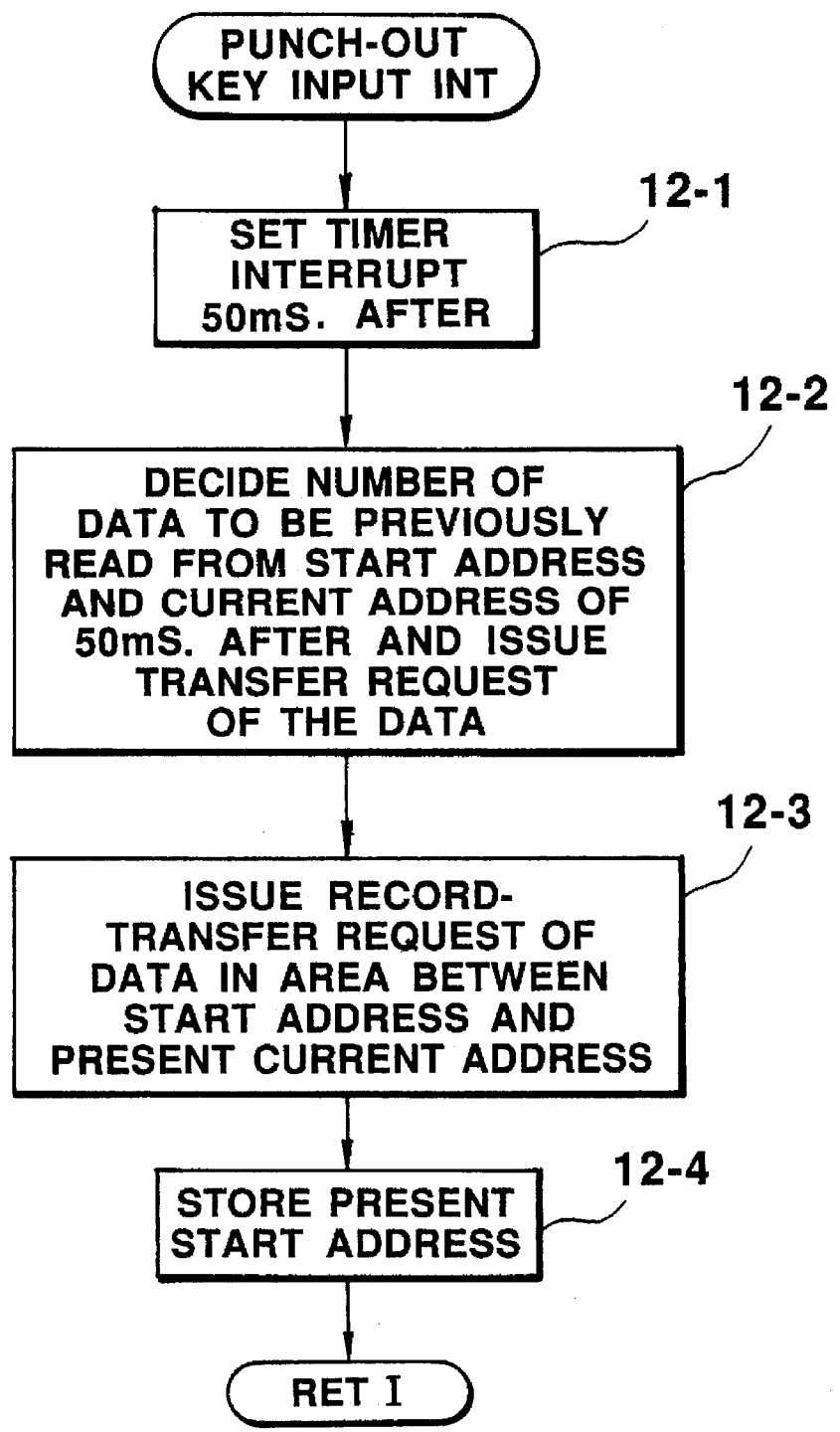
FIG. 12 is a flowchart illustrating an interrupt routine process of punch-out key input in the second embodiment.

Meanwhile, a punch-out key-input interrupt routine is shown in FIG. 12. In the first place, a timer interrupt is set at step 12-1 to be executed, for example, 50 ms. after. The time of 50 ms. is set in consideration of the longest delay in accessing the disk which will arise when a key input occurs for requesting the punch-out. Then, the operation goes to step 12-2, where number of data to be previously read and transferred is decided from a present start address and an address which will become the current address after 50 ms, and a request signal is issued for requesting transfer of the previously read data. At step 12-3, a record transfer request signal is issued for requesting unrecorded data (unrecorded data e at Time A of FIG. 15) stored in the area defined by the present start address and the current address. More specifically, the transfer request is issued at the punch-out key input to store in the hard disk data already stored in the buffer. The transfer requests issued at steps 12-2 and 12-3 will be executed at step 14-8 of FIG. 14.

The operation advances from step 12-3 to step 12-4, where the start address (the start address at Time A of FIG. 15) is stored. The start address will be executed at step 14-8 of FIG. 14.

Figure 13:
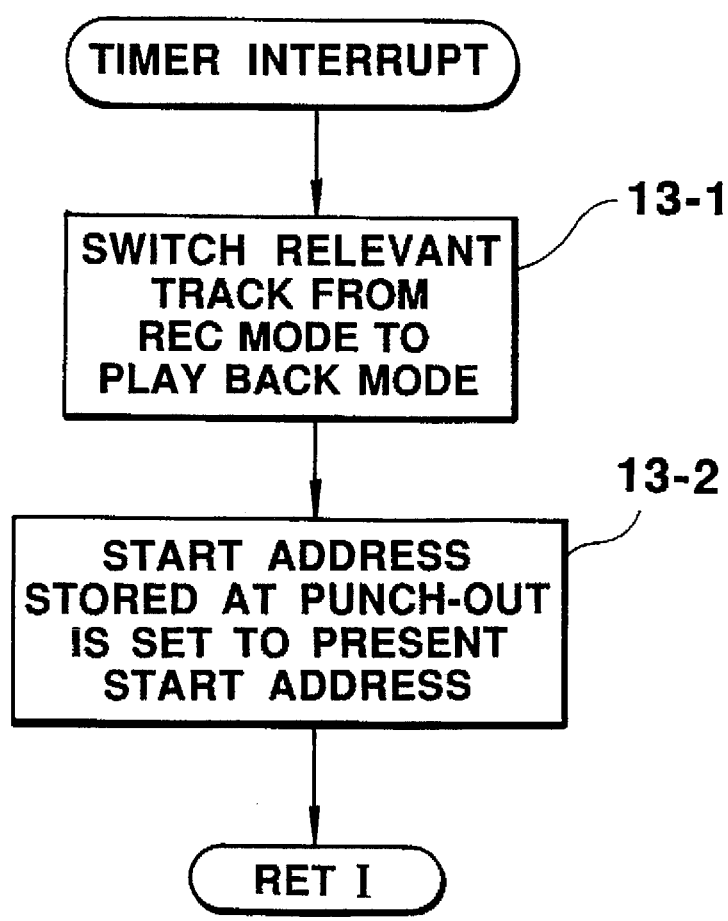
FIG. 13 is a flowchart illustrating a timer interrupt routine process in the second embodiment.

FIG. 13 is a flowchart of the timer interrupt routine process set at step 12-1 of FIG. 12. The timer interrupt routine process will be performed at a time when a time of 50 ms. lapses after the punch-out key is input. At step 13-1, tracks in the punch-in and punch-out operation are switched from the record mode to the play back mode. At step 13-2, the start address (start address stored at step 12-4 of FIG. 12) stored at the punch-out is set to the current start address. Since the above processes are executed at the time when 50 ms. lapses after the punch-out trigger, data starting from the time when 50 ms. lapses are previously read out without failure. The reproduction of data previously read out therefore may be performed after the time when 50 ms. lapses from the punch-out trigger.

Figure 14:
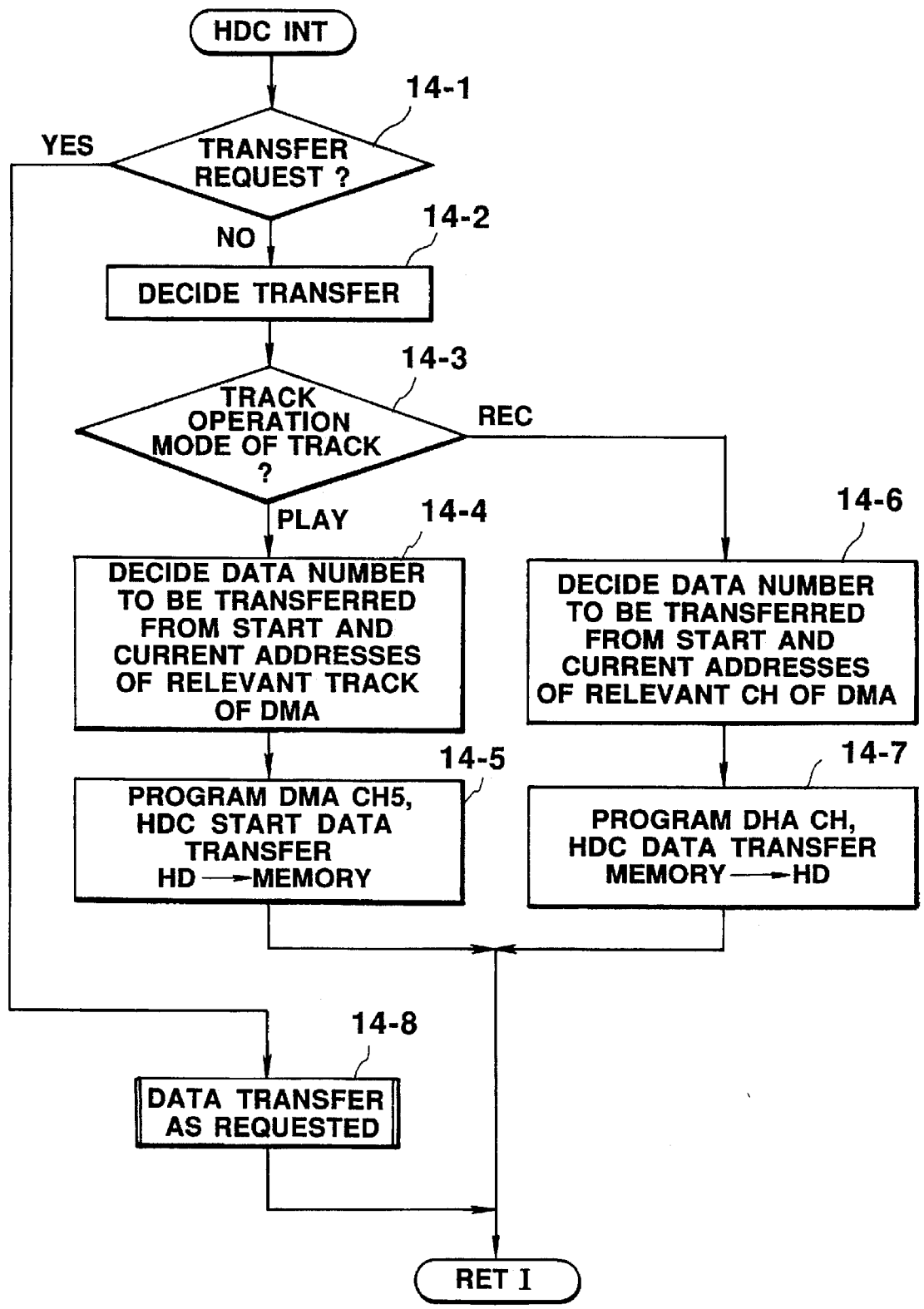
FIG. 14 is a flowchart illustrating an interrupt routine of a hard disk transfer termination in the second embodiment.

FIG. 14 is a flowchart of a hard-disk transfer termination interrupt-routine process in the second embodiment which will be performed when transfer operation in the hard disk is terminated. At step 14-1, it is judged if transfer request has been issued for the process to be executed with priority over other processes. If the result of the judgement is affirmative, the operation advances to step 14-8, where the transfer operation will be executed in response to the transfer request. This transfer request is issued, for example, at steps 12-2 and 12-3 of FIG. 12. A certain amount of data previously read out at the time when 50 ms. lapses after the punch-out trigger is transferred to the hard disk. Meanwhile, data (data e shown in FIGS. 15 and 16) which was already stored in the buffer at the punch-out key input is stored as punch-in data in a given area of the hard disk 12.

When it is judged at step 14-1 that no transfer request has been issued, the operation advances to step 14-2, where the track is decided to which or from which data is transferred. This track is decided with priority in order of the channels from CH1 to CH5 as in the same manner as done at step 4-2 of FIG. 4.

At step 14-3, it is judged which operation mode the track is set in at step 14-2. When the track is in the play back mode, the processes at steps 14-4 and 14-5 are executed while, when the track is in the record mode, the processes at steps 14-6 and 14-7 are executed.

When the track is in the play back mode, an empty capacity in a buffer of the channel (transfer channel) through which data is transferred is calculated at step 14-4 from the start address and the current address of the buffer and number of data corresponding to the calculated empty capacity is decided. At step 14-5, the hard disk controller 11 is programmed and data of the number decided at step 14-4 is transferred from the hard disk 12 through the channel CH5 to the buffer of the transfer channel.

When the track is in the record mode, an amount of unrecorded data left in the buffer of the channel (transfer channel) through which data is transferred is calculated at step 14-6 from the start address and the current address of the buffer, and number of data to be transferred and corresponding to the amount of left data is decided. At step 14-7, the hard disk controller 11 is programmed, and data of the number decided at step 14-6 is transferred from the buffer to the hard disk 12 via the channel CH5.

Figure 16:
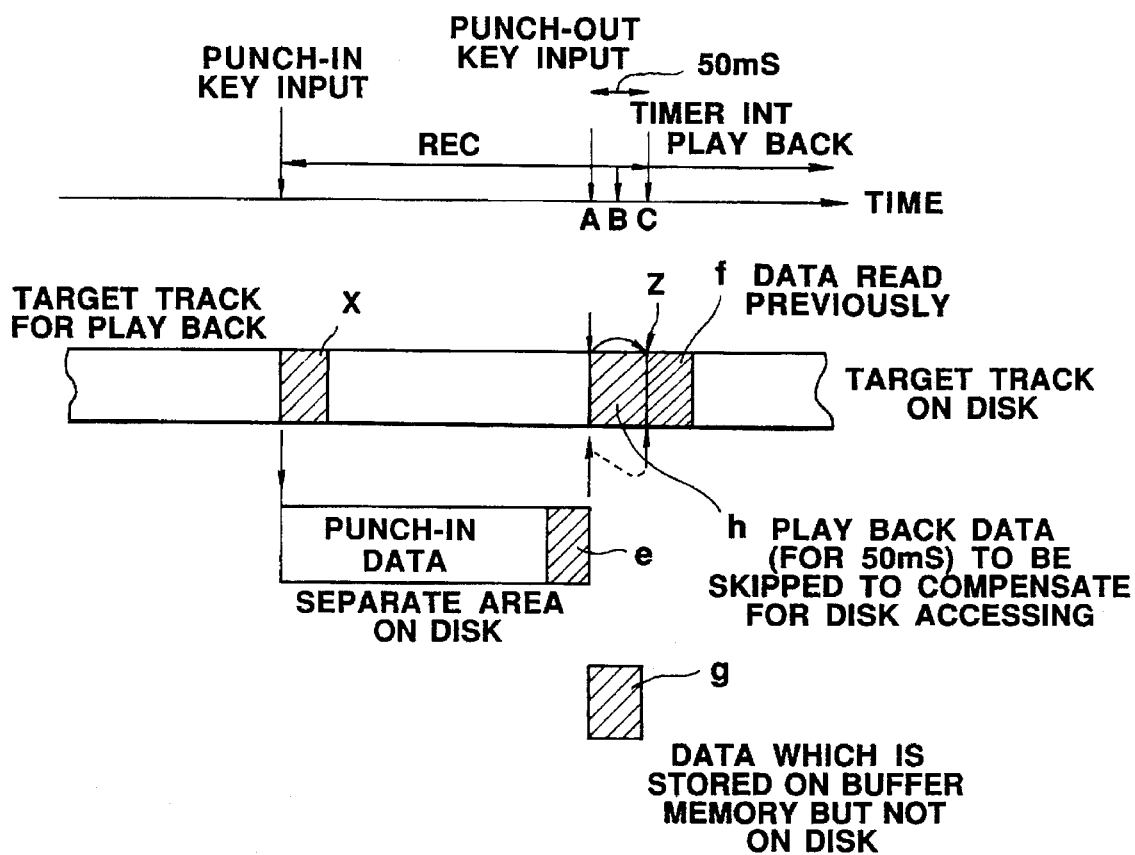
FIG. 16 is a view illustrating operation of a hard disk in the second embodiment.

In FIG. 16 is shown the data transfer operation of the hard disk 12 in the second embodiment. When the punch-in key input occurs, the hard disk 12 operates in a similar manner to the operation described with reference to FIG. 10.

When the punch-out key is input at the time A, a certain amount of data f which will be previously read out at the time when 50 ms. lapses after the time A is determined to be transferred to the buffer and is actually transferred at the time B. When the punch-out key is input, data e which was already written as punch-in data in the buffer is transferred to and written into the hard disk with a certain timing after the time A at step 14-8 of FIG. 14. Data g is written into the buffer but is not stored as punch-in data in the hard disk 12, which data g was transferred from the audio input devices to the buffers after the time A when the punch-out key is input. When it becomes the time C, the data f previously read out is sounded, and thereafter data following the data f on the hard disk 12 is successively transferred to the buffers and further supplied from the buffers to the audio I/O devices.

In this case, an audio signal g will be sounded, which is different in a strict sense from an audio signal h that will be generated by edition (when the audio signals input to the audio I/O devices 8-1 to 8-4 are monitored). Lack of sounding of the audio signal may be prevented in this case, too. More specifically, a signal which is different from the signal actually edited is sounded for a time duration of 50 ms. but thereafter the signal which is actually edited is sounded. Right after the punch-out, the data h stored in the hard disk 12 is not reproduced within the time duration of 50 ms. after the punch-out input but the data g which is input as the punch-in data is sounded in place of the data h. In the play back mode after edition, the data h stored in the hard disk 12 and the data f, following the punch-in data, are successively reproduced.

Figure 15:
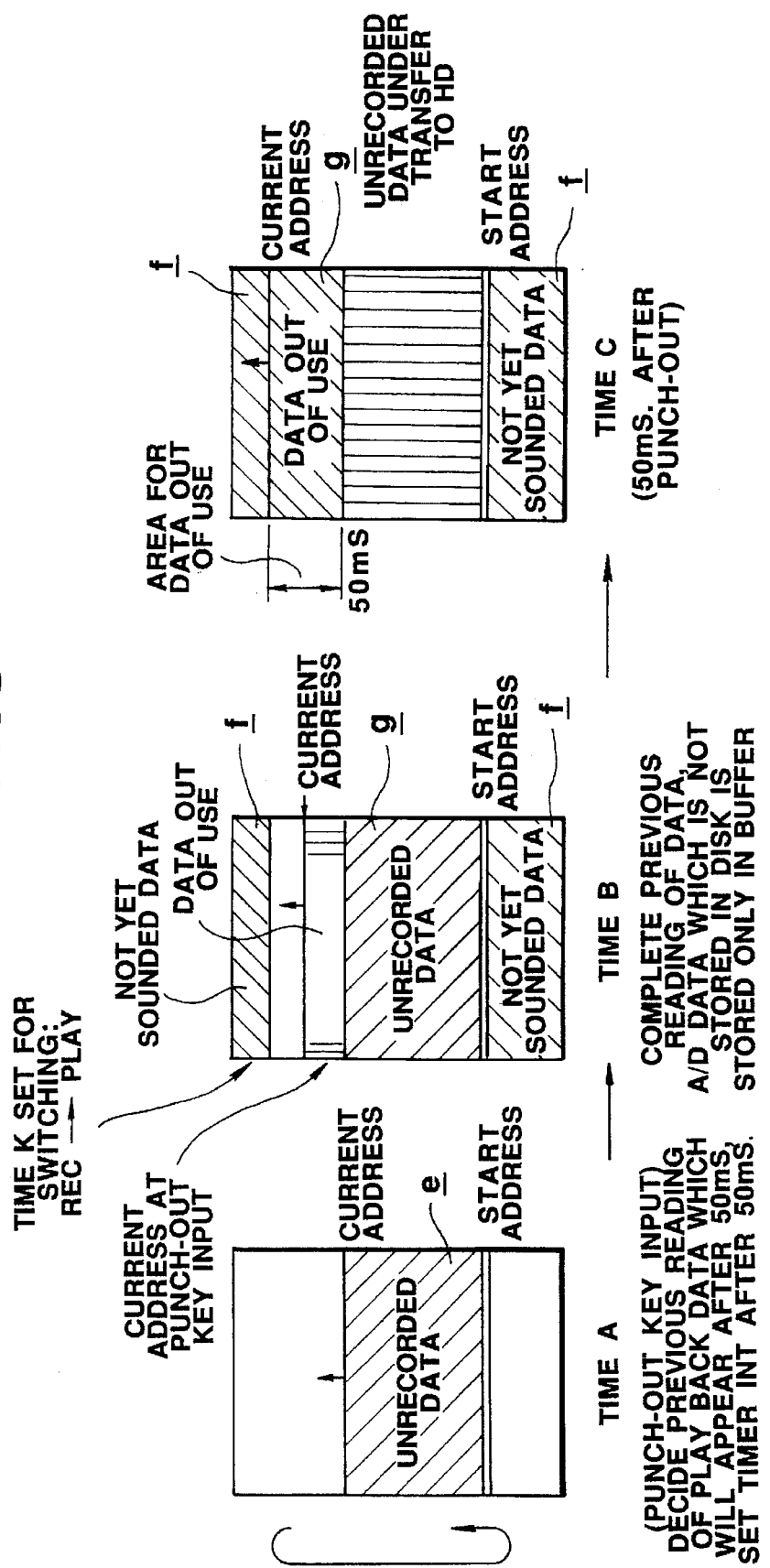
FIG. 15 is a view illustrating operation of a buffer in the second embodiment.

The operation of the buffers in the second embodiment at the punch-in is similar to that illustrated in FIG. 9A and its explanation will be omitted. The operation of the buffers at the punch-out is shown in FIG. 15.

When the punch-out key is input at the time A, previous data reading operation is decided for reading data which will appear 50 ms. after the time A, and the previous data reading operation will be actually executed at the time B before 50 ms. do not lapse after the time A. More specifically, at the time when 50 ms. lapse after the time A, data f to be read previously is written into an area between a position (address) k where the current address locates and the start address at the time A. After the time A, data g supplied as the punch-in data are successively written in following the unrecorded data e.

When the current address reaches the position k at the time C when 50 ms. lapse after the punch-out key input, the unsounded data f which has been previously read out will be read out from the buffers and will be output. The unrecorded data e will be transferred to and stored in the hard disk 12 at a certain time while the data g will not be transferred to the hard disk 12, but the unsounded data are successively input and written over the data g, eliminating the data g.

In the above second embodiment, the hard disk 12 is used as a memory medium, but a memory medium of a random access type such as, for example, a magneto-optical disk may be used as the memory medium.

<Third Embodiment>

A third embodiment of the digital recorder according to the present invention will be described hereafter.

Figure 17:
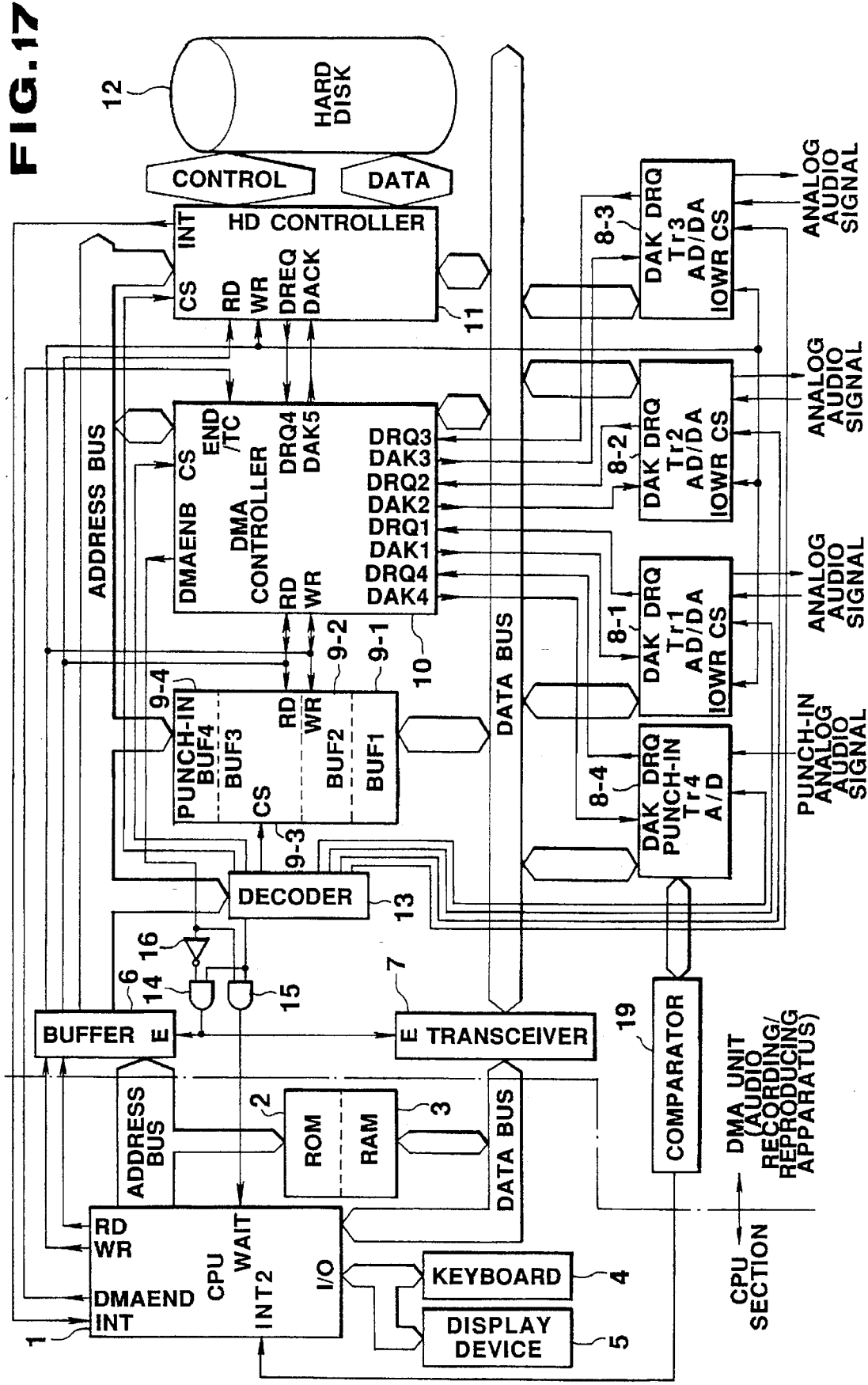
FIG. 17 is a block diagram showing a structure of a digital recorder in a third embodiment of the present invention.

The structure of the present embodiment illustrated in FIG. 17 is substantially equivalent to that of the first embodiment shown in FIG. 1. In FIG. 17, like components as those in FIG. 1 are designated by like reference numerals, and their description will be omitted.

In the third embodiment, recording/reproducing operation can be performed simultaneously for four tracks, and one track (track Tr4) is specialized only for punch-in operation (for recording operation).

The audio I/O device 8-4 is specialized for punch-in and performs only input operation. The audio I/O device 8-4 is connected with a punch-in buffer 9-4 (BUF4) to supply audio data thereto.

The present embodiment is provided with a comparator 19. The comparator 19 compares a level of an audio signal which is input to the audio I/O device 8-4 for punch-in with a predetermined reference level, and outputs a detection signal to CPU 1 when the level of the input audio signal exceeds the reference level. This detection signal serves as a punch-in command signal (an interrupt signal), as will be described later.

<General Operation of CPU 1>

Figure 18:
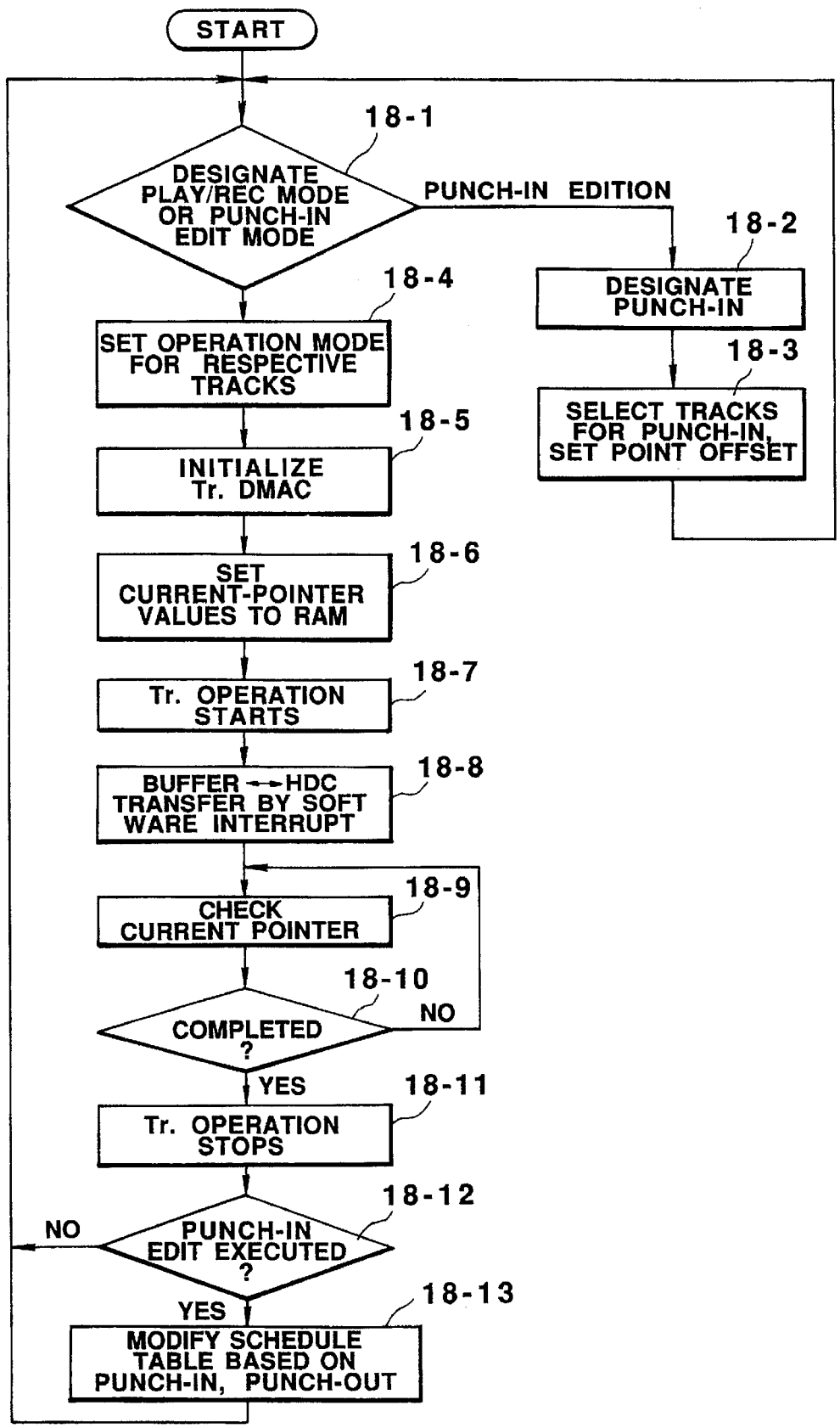
FIG. 18 is a flowchart of a main routine process for illustrating operation of the embodiment shown in FIG. 17.
Figure 19:
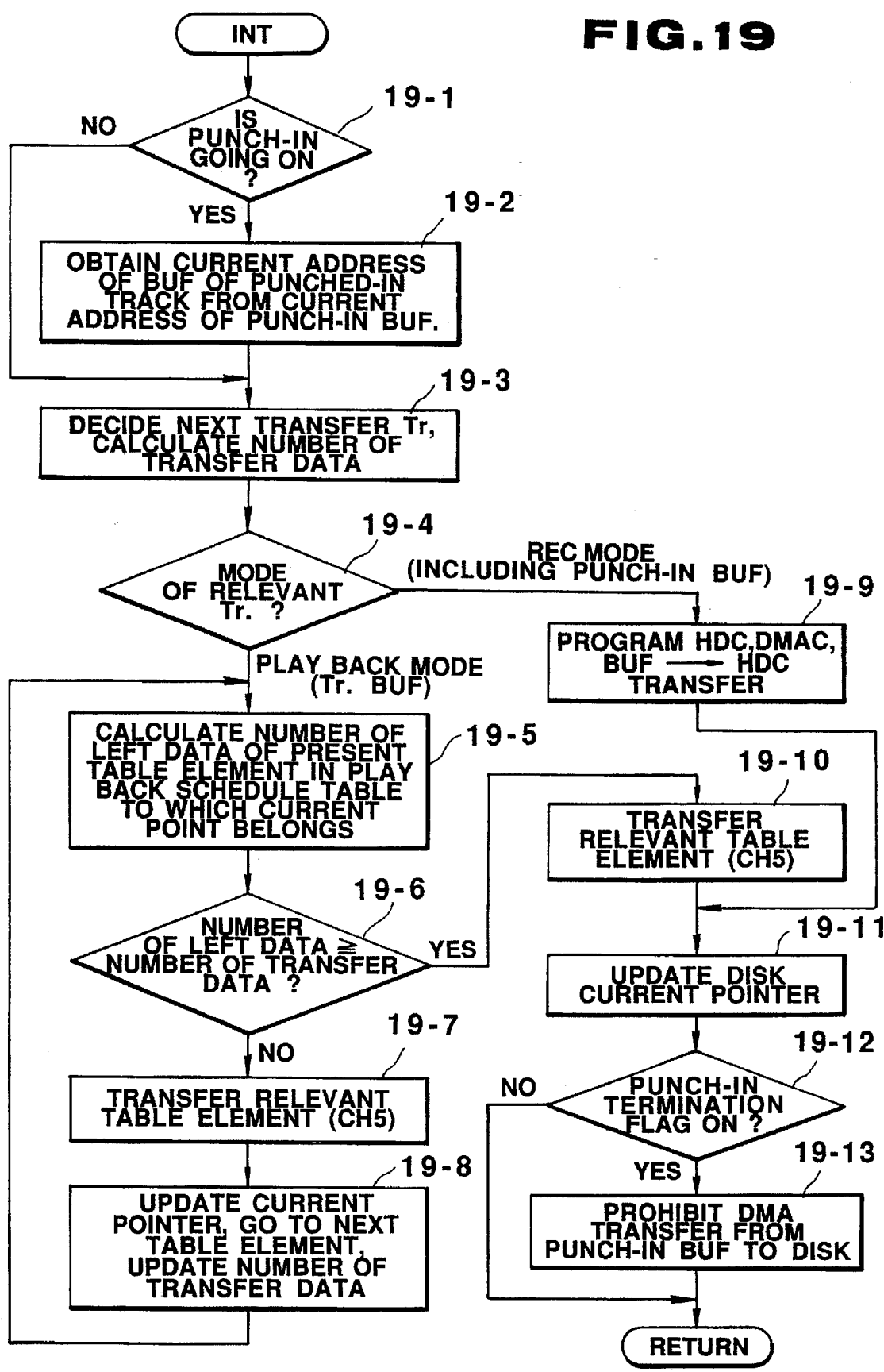
FIG. 19 is a flowchart of an interrupt routine process of a hard disk transfer termination for illustrating operation of the embodiment shown in FIG. 17.

The operation of CPU 1 will be described hereafter. Flowcharts of the operation of CPU 1 are shown in FIGS. 18 and 19. CPU 1 operates in accordance with a program (soft ware) stored in the program ROM 2. FIG. 18 is a flowchart of the main routine operation of CPU 1, and FIG. 19 is a flowchart showing the interrupt routine operation of CPU 1 which is executed in response to the interrupt signal INT from the HD controller 11.

In FIG. 18, CPU 1 judges at step 18-1 which mode, play/record mode or punch-in edit mode, is set by operation of the keyboard 4. Judging that the punch-in edit mode is set, CPU 1 goes to step 18-2, where it designates punch-in operation. At step 18-3, CPU 1 selects the track to be punched in and sets an amount of point offset. For example, the track Tr2 is selected from among the tracks Tr1 to Tr3 as a track to be punched in and a certain value is set for the amount of point offset. The amount of point offset designates how long the sound should go back from the time when a punch-in trigger occurs to be recorded. The sound can be recorded which goes back as much as the capacity of the punch-in buffer 9-4 at a maximum.

Now, an editing operation will be described. Under control of CPU 1 are performed programming of access points for the HD controller 11 and DMA controller 10 to read out data from the hard disk 12, data transfer operation to the RAM 3, various editing operations using the RAM 3, re-storing operation of digital audio data to the hard disk 12 and designation of the access points.

Figure 22:
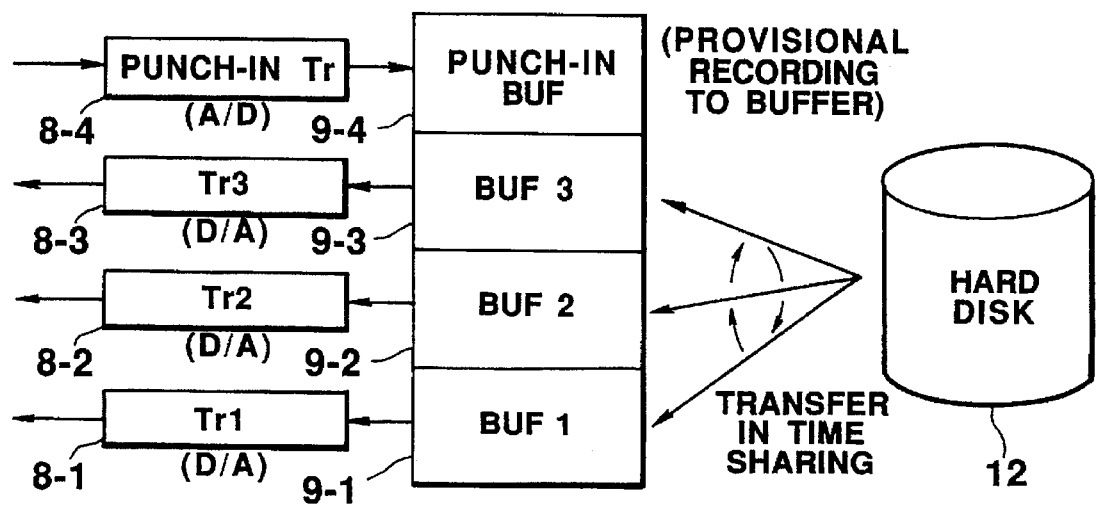
FIG. 22 is a view illustrating operation of the embodiment of FIG. 17 in a play back mode.

Judging at step 18-1 that the play/record mode is set at present, CPU 1 goes to step 18-4, where CPU 1 sets operation modes for three tracks respectively in accordance with the input commands from the keyboard 4. At step 18-5, CPU 1 successively sends designation signals CS to the audio I/O devices 8-1 to 8-3 through the buffer 6 and the decoder 13, giving IOWR to set which conversion, A/D conversion or D/A conversion, the audio I/O devices should perform. Assuming that the tracks Tr1 to Tr3 are all set to the play mode (D/A conversion is going on), a conception of operation on the whole is shown in FIG. 22.

CPU 1 controls at step 18-5 the DMA controller 10 to initialize addresses of the buffers 9-1 to 9-3 of the tracks Tr1 to Tr3 (when the punch-in is designated, the address of the buffer 9-4 is also initialized). More specifically, through operation of the address buffer 101, the register selector 103 and the channel selector 109 of FIG. 2, CPU 1 designates the respective registers of the channels CH1 to CH3 and send them initializing data via the data buffer 106 to initialize them.

The buffers 9-1 to 9-4 are arranged to be circularly used as a ring buffer. At the initial condition, the start addresses and the current addresses of the respective buffers 9-1 to 9-4 are set to coincide with each other.

Further, CPU 1 executes the process of step 18-6, initializing current pointers in a work memory area of RAM 3, current pointers which correspond to the tracks Tr1 to Tr3 in the hard disk 12 respectively. When the punch-in is designated, an area is secured on the hard disk 12 to store the punch-in data, and the current pointers are set to the secured area.

CPU 1 causes at step 18-7 the audio I/O devices 8-1 to 8-4 to execute A/D conversion or D/A conversion on data supplied thereto. At step 18-8, CPU 1 issues a soft ware interrupt, executing the process similar to the process which is executed when the HD controller 11 sends a program request for data transfer between the hard disk 12 and any one of the buffers 9-1 to 9-4 (when the HD controller 11 sends CPU 1 the interrupt signal INT), as will be described later.

More specifically, CPU 1 executes at step 18-8 processes in accordance with the flowchart of FIG. 19. For example, CPU 1 judges at step 19-1 whether or not the tracks are in the punch-in operation. When it is judged that the track is in the punch-in operation, the operation goes to step 19-2, where the current address of the buffer (for example, the buffer 9-2 of the track Tr2) with the track punched in is obtained from the current address of the punch-in buffer 9-4. When the track is not in the punch-in operation, the process at step 19-2 is skipped.

Figure 20:
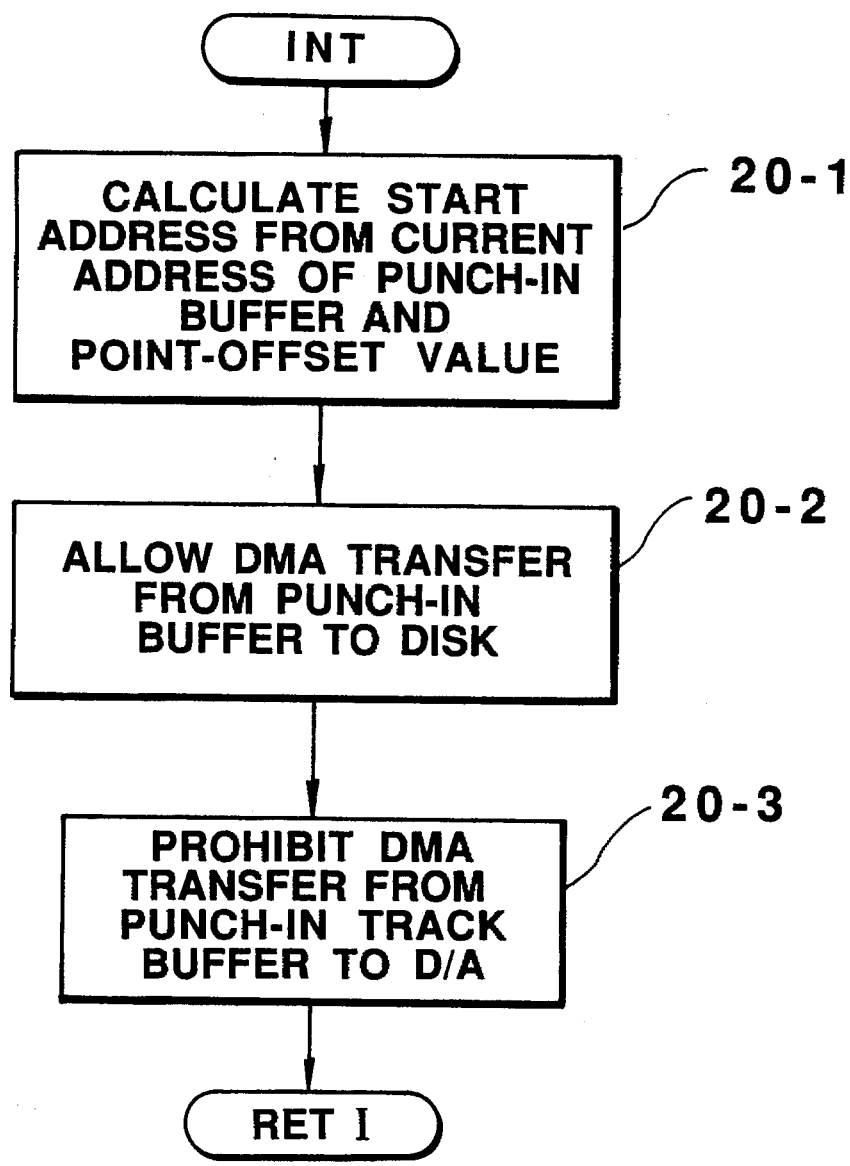
FIG. 20 is a flowchart of a punch-in trigger interrupt routine process for illustrating operation in the embodiment of FIG. 17.
Figure 23:
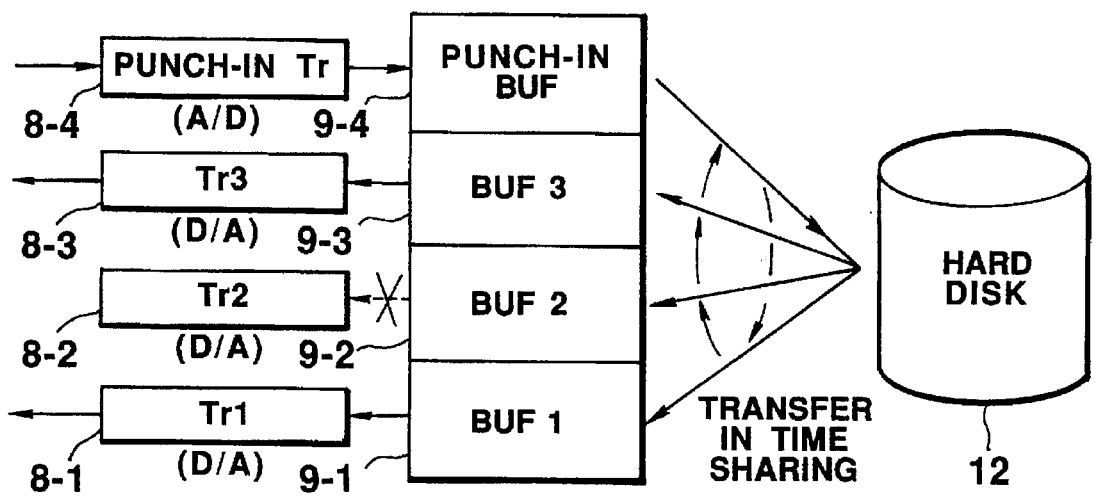
FIG. 23 is a view illustrating punch-in operation of the embodiment of FIG. 17.

More specifically, reproduced data are sequentially written into the punch-in track buffer 9-2 from the hard disk 12 during the punch-in operation, but the written data are prohibited from being read out to the audio I/O devices 8-2 (at step 20-3 of FIG. 20 and FIG. 23). The audio I/O devices 8-1 to 8-4 access the buffers 9-1 to 9-4 at the respective current addresses while the hard disk 12 accesses the buffers at the respective start addresses. Hence, the DMA controller 10 does not control the current address of the punch-in track buffer 9-2 during the punch-in operation. Meanwhile, data is input to the punch-in buffer 9-4 from the audio I/O device 9-4 is written therein during the punch-in operation, and the data is read out from the buffer 9-4 and is transferred to the hard disk 12. The DMA controller 10 consequently controls the current address of the punch-in buffer 9-4.

The current addresses of the buffers 9-1 to 9-4 vary in synchronism with one another. In other words, the current addresses of the buffers advance by one word address at one sample time. For example, assuming that a buffer length is secured in every 128k from the address 80000h in each buffer, and the start addresses for starting operation are at 80000, A0000, C0000 and E0000, the current address of the desired track may be converted to the current address of the other buffer by changing the value exceeding 17 bits because the less significant 17 bits of each track takes the same value all the time. The current address of the punch-in track buffer 9-2 therefore may be obtained from the current address of the punch-in buffer 9-4. When data is transferred from the hard disk 12 to the punch-in track buffer 9-2, the current address of the punch-in buffer 9-2 is used for calculating its empty capacity (at step 19-3).

At step 19-3, a track to which data is transferred is decided and the number of data to be transferred is calculated. In case that data transfer to be executed with priority over others is not scheduled, the priority order of data transfer to be executed will be set in the following order: the channel CH4 (for punch-in), the channels CH1, CH2 and CH3 (for record or for play back), and the channel CH5 (for data transfer with the hard disk 12). When the track is not in the punch-in operation, the track will not be selected because the audio signal in the punch-in buffer 9-4 is transferred to the hard disk 12 (FIG. 22). In the punch-in operation, however, data transfer is allowed toward the punch-in buffer 9-4 of the hard disk 12 at step 20-2 of FIG. 20 as will be described later (FIG. 23). The punch-in track therefore will be selected in a predetermined order at step 19-3. After the punch-out operation, the punch-in buffer 9-4 is selected so that, even if data amount in the punch-in buffer 9-4 is small, the data in the buffer 9-4 is transferred to the hard disk 12.

For example, CPU 1 selects at step 19-3 the channel CH1 corresponding to the track Tr1 as a channel in the DMA controller 10 to transfer digital audio data from the hard disk 12 to the buffer 9-1. CPU 1 reads out the current address and the start address from an area of the channel CH1 of the address register 104 in the DMA controller 10, and calculates number of data which is allowed to be transferred from the buffer 9-1 or to the buffer 9-1 (that is, in the play back mode, the number of data to be stored in an empty capacity in the buffer 9-1, i.e., the number of data which can be transferred to the buffer 9-1, and in the record mode, the maximum capacity of the buffer 9-1, i.e., the number of data which can be transferred from the buffer) is calculated from these addresses at step 19-3.

CPU 1 judges at step 19-4 whether the relevant track (the track Tr1 in this case) is in the record mode or in the play back mode. When the track is in the record mode (for example, when the punch-in is designated, the track is brought to the record mode), CPU 1 programs at step 19-9 the DMA controller 10 and the HD controller 11, and allows data transfer to be executed from the buffer 9-4 to the HD controller 10. More specifically, CPU 1 programs the DMA controller 10 by copying the start address of CH4 to the start address and the current address of the Ch5. The current address of CH5 increases every time a unit of data is transferred from the buffer 9-4 to the HD controller 11. Reading out the current pointer of the track Tr4 from the work memory area in RAM 3, CPU 1 programs the HD controller 11, using the read out pointer, the number of data calculated at step 19-3 to be transferred from the buffer 9-4 to the HD controller 11 and the mode (the record mode) detected at step 19-4.

As a result, the HD controller 11 makes a request (outputs DREQ) to the DMA controller 10 for DMA transfer from the buffer 9-4 to the hard disk 12, and the DMA controller 10 executes DMA transfer in response to the request from the HD controller 11. CPU 1 updates at step 19-11 the current pointer of the hard disk 12 to a value which the pointer will take after excursion of such DMA transfer. The DMA controller 10, from now on, will execute all the data transfer between the buffer 9-4 and the hard disk 12. When the DMA transfer is completed, CPU 1 sets the address of the hard disk 12 to the current pointer.

When it is judged at step 19-4 of FIG. 19 that the relevant track is in the play back mode, CPU 1 calculates at step 19-5 number of data of a present table element left in the play back schedule table to which the current pointer in RAM 3 belongs. The play back schedule table is prepared for each track. This table includes a start address and an end address which indicate respectively a starting point and an end point of an area to be reproduced on the hard disk 12, as shown in FIG. 24, and is stored in RAM 3, as described above. In the play back schedule table, one table element consists of one start address and one end address. The play back schedule table of FIG. 24 comprises five table elements.

The current pointers in RAM 3 are not to indicate memory positions, at which the audio I/O devices 8-1 to 8-4 are reproducing of recording audio data at present but to indicate addresses of the buffers 9-1 to 9-4 which the audio I/O devices 8-1 to 8-4 will access. That is, the outputs of the audio I/O devices 8-1 to 8-4 are sequentially written to the current addresses of the buffers 9-1 to 9-4, and data read out from the current addresses of the buffers 9-1 to 9-3 are supplied to the audio I/O devices 8-1 to 8-3.

If a value of the current pointer is 49000, and an end address of a table element to which the pointer belongs is 49899 as shown in FIG. 24, number of remaining data will be calculated as follows:

$$49899-(49000-1)=900$$

At step 19-6, the number of remaining data calculated at step 19-5 is compared with the number of data which is calculated at step 19-3 as allowed to be transferred. When the latter is larger than the former, the data indicated by the table element is transferred at step 19-7 from the hard disk 12 to the buffer 9-1. Assuming that the value of the current pointer is 49000, the number of the remaining data is 900 and the number of data which are allowed to be transferred is 5000, the audio data stored at the area corresponding to 900 addresses starting from the 49000th address in the hard disk 12 is transferred to the buffer 9-1 because 900<5000 is true.

CPU 1 programs the DMA controller 10 and the HD controller 11, allowing the data transfer to be executed from the hard disk 12 to the buffer 9-1. CPU 1 programs the DMA controller 10, by copying the start address of CH1 to the start address and the current address of CH4. The current address of CH5 increases every time when a unit of data is transferred from the hard disk 12 to the buffer 9-1. CPU 1 programs the HD controller 11 based on the value of the current pointer (in this case, 49000), the number of remaining data of the present table element calculated at step 19-5 (in this case, 900) and the operation mode detected at step 19-4 (in this case, the play back mode).

As a result, the HD controller 11 makes a request (outputs DREQ) to the DMA controller 10 for DMA transfer from the hard disk 12 to the buffer 9-1. The DMA controller 10 executes the DMA transfer as requested. At step 19-8, CPU 1 updates the current pointer to a value which the pointer will take after completion of the DMA transfer. In the instance of FIG. 24, the current pointer is updated to a value of 30000, and the operation goes to the following table element on the play back schedule table of FIG. 24 (the second table element from the top in FIG. 24). The number of data which are allowed to be transferred to the buffer 9-1 is also updated (to 4100, in this instance) at step 19-8.

The operation returns to step 19-5 again, where CPU 1 calculates the number of remaining data of the present table element in the play back schedule table, to which element the current pointer belongs (in the instance of FIG. 24, the number of the remaining data is 200, because data are from 30000 to 30199). The number (200) of the remaining data calculated at step 19-5 is compared at step 19-6 with the number of data which are allowed to be transferred to the buffer 9-1. In this instance, since the latter is larger than the former, the operation goes to step 19-7, where the data indicated in the play back schedule table is transferred to the buffer 9-1.

CPU 1 programs the DMA controller 10 using the current pointer and the number of the remaining data to execute the data transfer. CPU 1 effects the programming such that the address and the current address of CH5 are set to the value of the start address of CH1, and the data transfer from the hard disk 12 to the buffer 9-1 is completed at the time when the current address increases by the number of the remaining data.

CPU 1 performs the main routine process of FIG. 18 while data transfer of step 19-7 is being executed, and may return to the interrupt routine process of FIG. 19 at notice of the completion of the data transfer given by the DMA controller 10 or the HD controller 11. Upon completion of the data transfer, the current pointer is updated to 120100 shown in FIG. 24 and the number of data which are allowed to be transferred is updated to 3900 (step 19-8).

Then, the operation returns to step 19-5, where number of remaining data of the table element is calculated, again. In the present case, the number of remaining data is given as follows:

19800=(139899−120100+1)

Since the number (19800) of the remaining data is larger than the number (3900) of data which are allowed to be transferred, the operation goes from step 19-6 to step 19-10, where data (3900 units of data) stored on an area corresponding to 3900 addresses starting from the 120100th address of the hard disk 12. At step 19-11, the current pointer is updated to 124000.

The operation goes from step 19-11 to step 19-12, where CPU 1 judges whether or not a punch-in terminating flag is on. When the punch-in terminating flag is on at step 21-3 of FIG. 21, the operation goes from step 19-12 to step 19-13, where DMA transfer from the punch-in buffer 9-4 to the hard disk 12 is prohibited. Thereby, data in the punch-in buffer 9-4 is prohibited from being transferred to and recorded in the hard disk 12 after punch-out.

After execution of the process for prohibiting DMA transfer from the punch-in buffer 9-4 to the hard disk 12, or when it is judged at step 19-12 that the punch-in terminating flag is on, CPU 1 returns to the main routine process.

As will be understood from the later description, when the first interrupt routine process of FIG. 19 is executed, and the HD controller 11 is activated once, the HD controller 11 issues the interrupt (to send the INT signal to CPU 1) every time when transfer of the data block designated by CPU 1 is completed, so that CPU 1 judges if the record/play operation is terminated, if the key input such as the punch-in and the punch-out is made or if the trigger indicated in the control data is initiated.

CPU 1 refers at step 18-9 the current pointer (RAM 3), and judge at step 18-10 whether or not the memory area is over or the record/play operation is terminated. When the result of the judgement is "YES", CPU 1 stops at step 18-11 A/D conversion and D/A conversion in the audio I/O devices 8-1 to 8-4. When it is judged at step 18-12 that no punch-in edition is effected, the operation returns to step 18-1. When the result of the judgement at step 18-10 is "NO", CPU 1 returns to step 18-9 to check the current pointer.

When it is judged at step 18-12 that the punch-in edition is effected, the operation goes to step 18-13, where a punch-in point set and stored at step 20-1 of FIG. 20 and a punch-out point set and stored at step 21-1 of FIG. 21 as will be described later are made to return to the original points, and the schedule table is modified. Data therefore will be reproduced thereafter with the punch-in data substituted for in the normal reproduction.

In the play/record mode, after the initialization at steps 18-4 to 18-8, CPU 1 repeatedly executes processes of steps 18-9 and 18-10. In response to a change command from the keyboard 4 (e.g., a pause (stop of A/D or D/A conversion), a punch-in or punch-out (switching between A/D and D/A conversion)) or a change in the control data obtained in the editing mode, CPU 1 immediately stops the DMA transfer control operation, changes the program, and then restarts the similar process.

Operation of the third embodiment will be described with reference to FIG. 20, when the punch-in instruction is issued through the keyboard 4. When the punch-in instruction is issued, the punch-in trigger interrupt routine process is executed in accordance with the flowchart of FIG. 20. The start address of the punch-in buffer 9-4 is calculated and stored as the punch-in point at step 20-1. The start address of the punch-in buffer 9-4 is calculated from the current address of the punch-in buffer 9-4 and the point offset set at step 18-3 of FIG. 18. More specifically, as shown in FIG. 22, the punch-in buffer 9-4 has sequentially stored data sent from the audio I/O device 8-4, before the punch-in trigger is input. Since the data are not transferred to the hard disk 12, the punch-in buffer 9-4 sequentially stores punch-in data input thereto, and further the buffer 9-4 writes the data over the data previously stored therein when an amount of data which exceed the capacity of the buffer 9-4 are still transferred thereto. At the time when the punch-in trigger is input, punch-in data which were previously supplied to the punch-in buffer 9-4 have been already written therein.

The data which are stored in the area from the current address to the address going back by a predetermined offset value may compensate the delay in the punch-in key input, when they are transferred as the punch-in data to the hard disk 12. For example, when a user of the present digital recorder operates the punch-in key at a given time, listening to the audio signal reproduced from the buffer 9-2 to be punched-in, the time when the punch-in trigger occurs actually will be delayed a little from the punch-in point which the user desires. The offset value corresponding to the above delay may compensate the delay.

When the start address is set at a position which goes backs from the current address by a value corresponding to the offset value, data stored on the area from the above start address will be sequentially transferred to the hard disk 12. Data including the offset value may be consequently transferred to the hard disk 12.

At step 20-2, a program is made to allow DMA transfer from the punch-in buffer 9-4 to the hard disk 12. At step 19-3 of FIG. 19, the punch-in buffer 9-4 is selected as a transfer-track and the data of the transfer-track is transferred to the hard disk 12 (FIG. 23). A program is made at step 20-3, prohibiting data transfer to the audio I/O device 8-2 of the punch-in track buffer (the buffer 9-2, in this case), and thereby the buffer 9-2 will not be selected as the transfer-track at step 19-3. As a result, the data written in the buffer 9-2 will not be supplied to the audio I/O device 8-2 any more and will not be subjected to D/A conversion for sounding, accordingly (FIG. 23).

Figure 21:
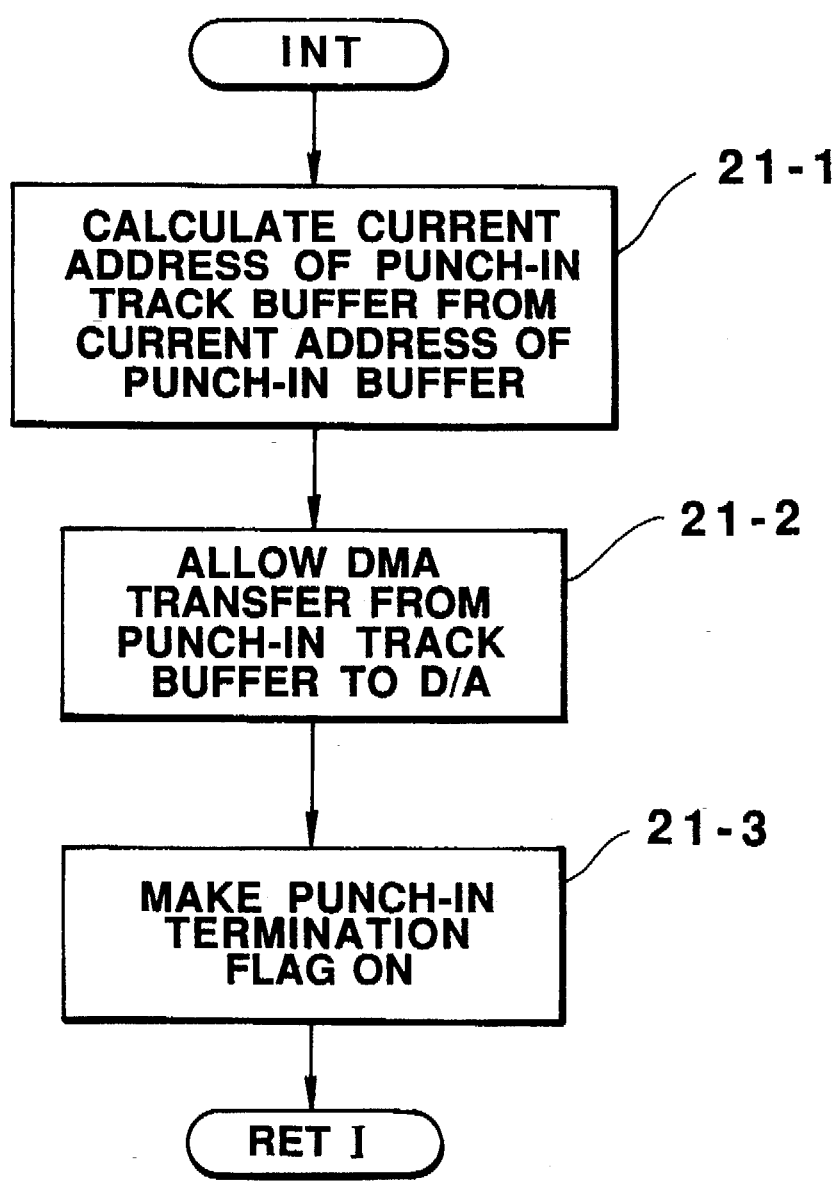
FIG. 21 is a flowchart of a punch-out trigger interrupt routine process for illustrating operation in the embodiment of FIG. 17.

Meanwhile, when the punch-out is instructed by operation of the keyboard 4, a punch-out trigger interrupt routine process of FIG. 21 will be executed. At step 21-1, the current address of the punch-in track buffer (the buffer 9-2, in this case) is obtained from the current address of the punch-in buffer 9-4. The process for obtaining the current address of the punch-in track buffer is similar to that of step 19-2 of FIG. 19. Data are supplied from the hard disk 12 to the punch-in track buffer 9-2 to be successively stored therein at the start addresses. Since the data written in the punch-in track buffer 9-2 are not read out to the audio I/O device 8-2 (data transfer to the audio I/O device 8-2 is prohibited at step 20-3), DMA controller 10 can not control the current address of the buffer 9-2. The current address of the punch-in track buffer 9-2 therefore is calculated from the current address of the punch-in buffer 9-4 which works in synchronism with the buffer 9-2.

A program is made at step 21-2, allowing data of the punch-in track buffer 9-2 to be read out. The program allows the buffer 9-2 to be selected as the transfer-buffer. As a result, the data written in the buffer 9-2 is supplied to the audio I/O device 8-2 to be sounded.

At step 21-3, the punch-in terminating flag is made on, prohibiting reading the punch-in buffer 9-4 at step 19-13 of FIG. 19. When the interrupt routine process of the hard disk transfer termination shown in FIG. 19 is executed after the punch-in terminating flag is made on, data transfer of the punch-in buffer 9-4 is selected with priority and the data of the buffer 9-4 is stored in a predetermined area of the hard disk 12. Independent tracks corresponding to the respective buffers 9-1 to 9-4 have been prepared in the hard disk 12. The punched-in data therefore will not be written over data on the punch-in tracks but only data in the schedule table will be modified, as explained at step 18-13. The modified schedule table allows the original audio signal with no punch-in data substituted to be reproduced. Re-edition of data is allowed for any times.

In the above description, the punch-in trigger is input by operation of the keyboard 4, but if the detection signal is used as the punch-in trigger signal, the detection signal which the comparator 19 generates when the level of the punch-in audio signal exceeds the reference level, i.e., if the punch-in trigger interrupt process shown in FIG. 20 is arranged to be executed in response to the detection signal, the punch-in process is allowed to automatically start. The arrangement that allows the punch-in operation to automatically start when the punch-in audio signal exceeds a given reference level has a tendency that make the audio signal easily loose its attack portion at the moment of punch-in. In the present embodiment, however, the data is prevented from loosing its portion because the audio signal which is input before the trigger signal is input can be secured as punch-in data by offset.

FIG. 22 is a view showing the operation of the third embodiment before the punch-in process starts. In the third embodiment, three tracks Tr1 to Tr3 are in the play back mode. Data therefore are sequentially transferred from the hard disk 12 to the tracks of the channels corresponding to the buffers 9-1 to 9-3 in a time sharing manner. Data read out from the buffers 9-1 to 9-3 are supplied to the audio I/O devices 8-1 to 8-3 to be subjected to D/A conversion for sounding. During these processes, an externally input audio signal is converted into a digital audio signal by the audio I/O device 8-4 and is written in the punch-in buffer 9-4. The data written in the punch-in buffer 9-4, however, will not be transferred to the hard disk 12.

FIG. 23 is a view showing the operation of the third embodiment in the punch-in operation. Data written in the punch-in buffer 9-4 has been read out and transferred to the hard disk 12. Meanwhile, on the track Tr2 to be punched-in, data are sequentially transferred from the hard disk 12 to the buffer 9-2 to be written therein. The data written in the buffer 9-2, however, are not read out, and no sound is output from the track Tr2.

Operations of the audio I/O devices 8-1 to 8-4, the DMA controller 10 and the HD controller 11 in the third embodiment will not be described, because they are similar to those of the first and second embodiments explained above.

Several embodiments of the present invention have been described in detail but these embodiments are simply illustrative and not restrictive. The present invention may be modified in various manners. All the modifications and applications of the present invention will be within the scope and spirit of the invention, so that the scope to the present invention should be determined only by what is recited in the appended claims and their equivalents.

What is claimed is:

1. A digital recorder comprising:

audio input/output means which is switchable between an input operation mode and an output operation mode, for executing multiple tracks of audio signal input operations at said input operation mode and for executing multiple tracks of audio signal output operations at said output operation mode;

memory medium means of a random access type for storing an audio signal;

temporary storing means coupled to said memory medium means and to said audio input/output means and having a plurality of memory areas corresponding to the multiple tracks, for temporarily storing an audio signal inputted from said audio input/output means and for supplying the audio signal inputted from said audio input/output means to said memory medium means for respective tracks, and for temporarily storing an audio signal inputted from said memory medium means and supplying the audio signal inputted from said memory medium means to said audio input/output means for respective tracks;

punch-in control means, coupled to said audio input/output means, to said memory medium means and to said temporary storing means, and being responsive to an instruction of a punch-in operation corresponding to one specified track occurring at a first pre-programmed timing, for switching said audio input/output means from said output operation mode to said input operation mode and for causing an audio signal read out, from said temporary storing means to be stored in said memory medium means; and punch-out control means, coupled to said audio input/output means, to said memory medium means and to said temporary storing means, and being responsive to an instruction of a punch-out operation corresponding to the specified track occurring at a second pre-programmed timing, for causing an audio signal to be read out from said memory medium means before an actual punch-out operation is executed and to be stored in said temporary storing means at a predetermined time that is before an execution time when the actual punch-out operation is executed at a third preprogrammed timing, and for causing an output of said temporary storing means to be supplied to said audio input/output means and switching said audio input/output means from said input operation mode to said output operation mode for said specified track.

2. A digital recorder according to claim 1, wherein said memory medium means comprises a disk memory medium of a random access type.

3. A digital recorder comprising:

audio input/output means which is switchable between an input operation mode and an output operation mode, for executing multiple tracks of audio signal input operations at said input operation mode and for executing multiple tracks of audio signal output operations at said output operation mode;

memory medium means of a random access type for storing an audio signal;

temporary storing means coupled to said memory medium means and to said audio input/output means and having a plurality of memory areas corresponding to the multiple tracks, for temporarily storing an audio signal inputted from said audio input/output means and for supplying the audio signal inputted from said audio input/output means to said memory medium means for respective tracks, and for temporarily storing an audio signal inputted from said memory medium means and for supplying the audio signal inputted from said memory medium means to said audio input/output means for respective tracks;

punch-in control means, coupled to said audio input/output means, to said memory medium means and to said temporary storing means, and being responsive to an instruction of a punch-in operation corresponding to one specified track occurring at an arbitrary timing, for switching said audio input/output means from said output operation mode to said input operation mode and for causing an audio signal read out from said temporary storing means to be stored in said memory medium means; and punch-out control means, coupled to said audio input/output means, to said memory medium means and to said temporary storing means, and being responsive to an instruction of a punch-out operation corresponding to the specified track occurring at another arbitrary timing, for causing, at a predetermined time after an accessing time, an audio signal to be read out from said memory medium means before an actual execution time of the punch-out operation and to be stored in said temporary storing means, and for causing an output of said temporary storing means to be supplied to said audio input/output means when the actual execution time is reached for reading out the audio signal which was read out before switching said audio input/output means from said input operation mode to said output operation mode for said specified track.

4. A digital recording according to claim 3, wherein said memory medium means comprises a disk memory medium of a random access type.

5. A digital recorder comprising: memory medium means of a random access type for storing an audio signal;

first storing means in which an audio signal inputted for a punch-in operation is written;

second storing means having a plurality of memory areas corresponding to the multiple tracks in which an audio signal reproduced from the audio signal stored in said memory medium means is written for respective tracks, said second storing means being adapted to operate in parallel with said first storing means;

instruction means for issuing a command signal with respect to one specified track for a punch-in operation at an arbitrary timing and for issuing another command signal for a punch-out operation at another arbitrary timing; and control means coupled to said memory medium means, to said first and second storing means and to said instruction means, and including means for causing the audio signal written in said first storing means to be read out therefrom and for causing the read out audio signal to be stored in said memory medium means when said instruction means issues the command signal for the punch-in operation with respect to said specified track, while preventing the audio signal written in said second storing means from being read out, but enabling the audio signal read out from said memory medium means to be written continuously in said second storing means for respective tracks, and said control means further including means for preventing the audio signal written in said first storing means from being stored in said memory medium means when said instruction means issues the another command signal for the punch-out operation with respect to said specified track, while enabling a most recent audio signal written in said second storing means to be read out therefrom.

6. A digital recorder according to claim 5, wherein said instruction means includes means for detecting a volume level of an audio signal for a punch-in operation and issues the command signal for the punch-in operation when the detected volume level of the audio signal exceeds a predetermined reference level.

7. A digital recorder according to claim 5, wherein said control means further includes means for causing a portion of an audio signal included in the audio signal written in said first storing means to be stored in said memory medium means, said portion of the audio signal being reproduced at a predetermined time before an execution time indicated in the command signal for a punch-in operation so that a compensation for a delayed time for a punch-in key operation is made.

8. A digital recorder according to claim 5, wherein said memory medium means comprises a disk memory medium of a random access type.

* * * * *